US009158721B2

(12) United States Patent
Suwabe

(10) Patent No.: US 9,158,721 B2
(45) Date of Patent: Oct. 13, 2015

(54) INFORMATION PROCESSING APPARATUS, CONTROL METHOD, AND PROGRAM

(75) Inventor: Takeshi Suwabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 906 days.

(21) Appl. No.: 12/698,339

(22) Filed: Feb. 2, 2010

(65) Prior Publication Data

US 2010/0211963 A1 Aug. 19, 2010

(30) Foreign Application Priority Data

Feb. 18, 2009 (JP) ................................ 2009-035818

(51) Int. Cl.
*G06F 9/44* (2006.01)
*G06F 13/12* (2006.01)
*G06F 13/38* (2006.01)

(52) U.S. Cl.
CPC .................................. *G06F 13/385* (2013.01)

(58) Field of Classification Search
None
See application file for complete search history.

(56) References Cited

U.S. PATENT DOCUMENTS

| | | | | |
|---|---|---|---|---|
| 6,957,437 | B1 * | 10/2005 | Bogia et al. | 719/327 |
| 7,043,575 | B2 | 5/2006 | Stephan | |
| 7,788,425 | B2 | 8/2010 | Ikemoto | |
| 8,069,281 | B2 | 11/2011 | Ikemoto | |
| 2002/0083227 | A1 * | 6/2002 | Machida | 710/8 |
| 2002/0143921 | A1 * | 10/2002 | Stephan | 709/223 |
| 2005/0080936 | A1 * | 4/2005 | Ray et al. | 710/1 |
| 2006/0023253 | A1 * | 2/2006 | Byun et al. | 358/1.15 |
| 2006/0036780 | A1 | 2/2006 | Dernis et al. | 710/36 |
| 2007/0038785 | A1 * | 2/2007 | Varanda et al. | 710/62 |
| 2008/0037050 | A1 * | 2/2008 | Sasaki | 358/1.13 |
| 2009/0031061 | A1 * | 1/2009 | Lee | 710/63 |
| 2009/0089463 | A1 * | 4/2009 | Iga | 710/37 |

FOREIGN PATENT DOCUMENTS

| | | | |
|---|---|---|---|
| EP | 1 248 179 | A1 | 10/2002 |
| JP | 2006-021499 | A | 1/2006 |
| JP | 2006-65859 | | 3/2006 |
| JP | 2006-185218 | A | 7/2006 |
| JP | 2007-140689 | A | 6/2007 |
| KR | 10-2007-0009288 | A | 1/2007 |

OTHER PUBLICATIONS

Sep. 30, 2011 European Search Report in European Patent Appln. No. 10153865.0.

* cited by examiner

*Primary Examiner* — H S Sough
*Assistant Examiner* — Umut Onat
(74) *Attorney, Agent, or Firm* — Fitzpatrick, Cella, Harper & Scinto

(57) ABSTRACT

An information processing apparatus capable of USB-connecting a device compatible with USB connection, the apparatus has a management unit configured to manage driver information representing whether to activate a device driver when the device is USB-connected. The information processing apparatus also has a device information acquisition unit configured to acquire device information of the device. The information processing apparatus also has a setting unit configured to set up the driver under control of an USB core driver to control the device using a device driver corresponding to the driver information when the driver information matches the device information.

11 Claims, 19 Drawing Sheets

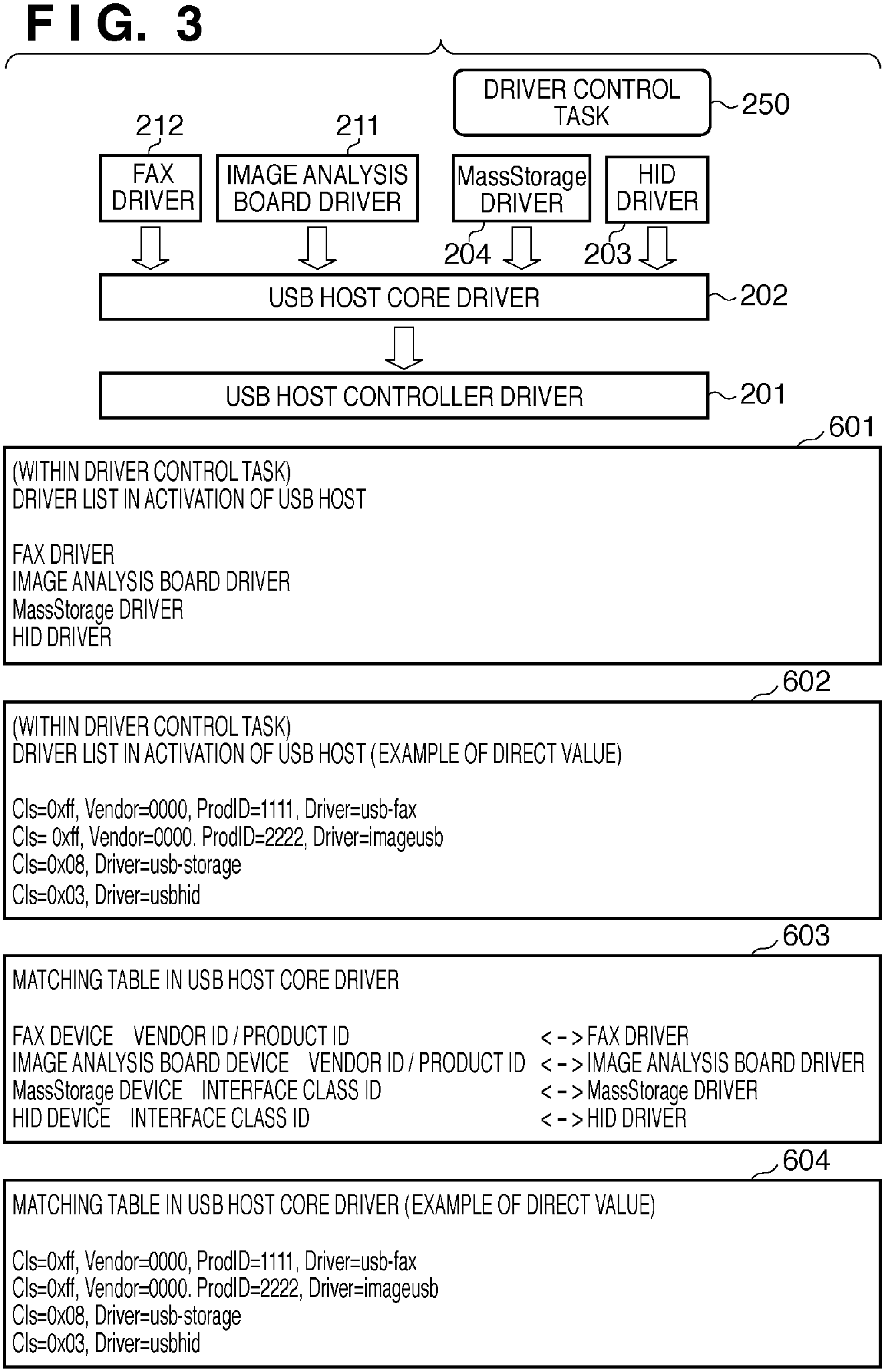

FIG. 3

601
(WITHIN DRIVER CONTROL TASK)
DRIVER LIST IN ACTIVATION OF USB HOST

FAX DRIVER
IMAGE ANALYSIS BOARD DRIVER
MassStorage DRIVER
HID DRIVER 602
(WITHIN DRIVER CONTROL TASK)
DRIVER LIST IN ACTIVATION OF USB HOST (EXAMPLE OF DIRECT VALUE)

Cls=0xff, Vendor=0000, ProdID=1111, Driver=usb-fax
Cls= 0xff, Vendor=0000. ProdID=2222, Driver=imageusb
Cls=0x08, Driver=usb-storage
Cls=0x03, Driver=usbhid

603
MATCHING TABLE IN USB HOST CORE DRIVER

FAX DEVICE    VENDOR ID / PRODUCT ID                      <-> FAX DRIVER
IMAGE ANALYSIS BOARD DEVICE   VENDOR ID / PRODUCT ID   <-> IMAGE ANALYSIS BOARD DRIVER
MassStorage DEVICE   INTERFACE CLASS ID                  <-> MassStorage DRIVER
HID DEVICE    INTERFACE CLASS ID                           <-> HID DRIVER

604
MATCHING TABLE IN USB HOST CORE DRIVER (EXAMPLE OF DIRECT VALUE)

Cls=0xff, Vendor=0000, ProdID=1111, Driver=usb-fax
Cls=0xff, Vendor=0000. ProdID=2222, Driver=imageusb
Cls=0x08, Driver=usb-storage
Cls=0x03, Driver=usbhid

EXAMPLE OF PROTOCOL INFORMATION (FOR USB MEMORY)

```
T: Bus=05 Lev=01 Prnt=01 Port=00 Cnt=01 Dev#=4 Spd=480 MxCh=0
D: Ver=2.00 Cls=00 ( > ifc ) Sub=00 Prot=00 MxPS=64 #Cfgs=1
P: Vendor=04bb ProdID=0c2a Rev=bb.03
S: Manufacturer=X Inc.
S: Product=USB Flash Disk
S: SerialNumber=A0C0470407000073
C: * #Ifs= 1 Cfg#= 1 Atr=80 MxPwr=200mA
I: If#= 0 Alt=0 #EPs=2 Cls=08(stor.) Sub=06 Prot=50 Driver=usb-storage
E: Ad=81(I) Atr=02(Bulk) MxPS= 512 Ivl=0ms
E: Ad=02(O) Atr=02(Bulk) MxPS= 512 Ivl=31875us
```

650, 632, 651, 631, 640

F I G. 15A
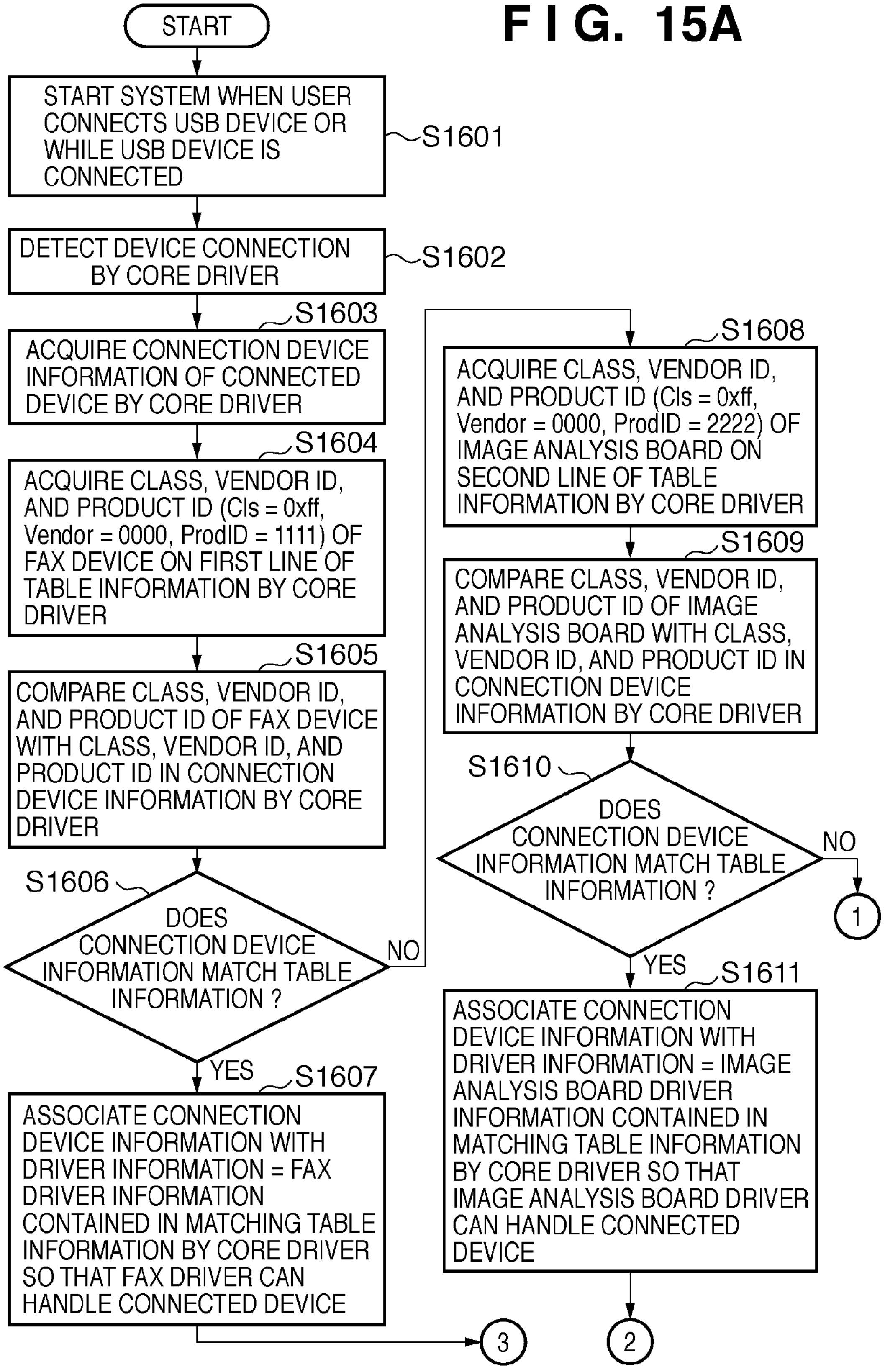

F I G. 18A
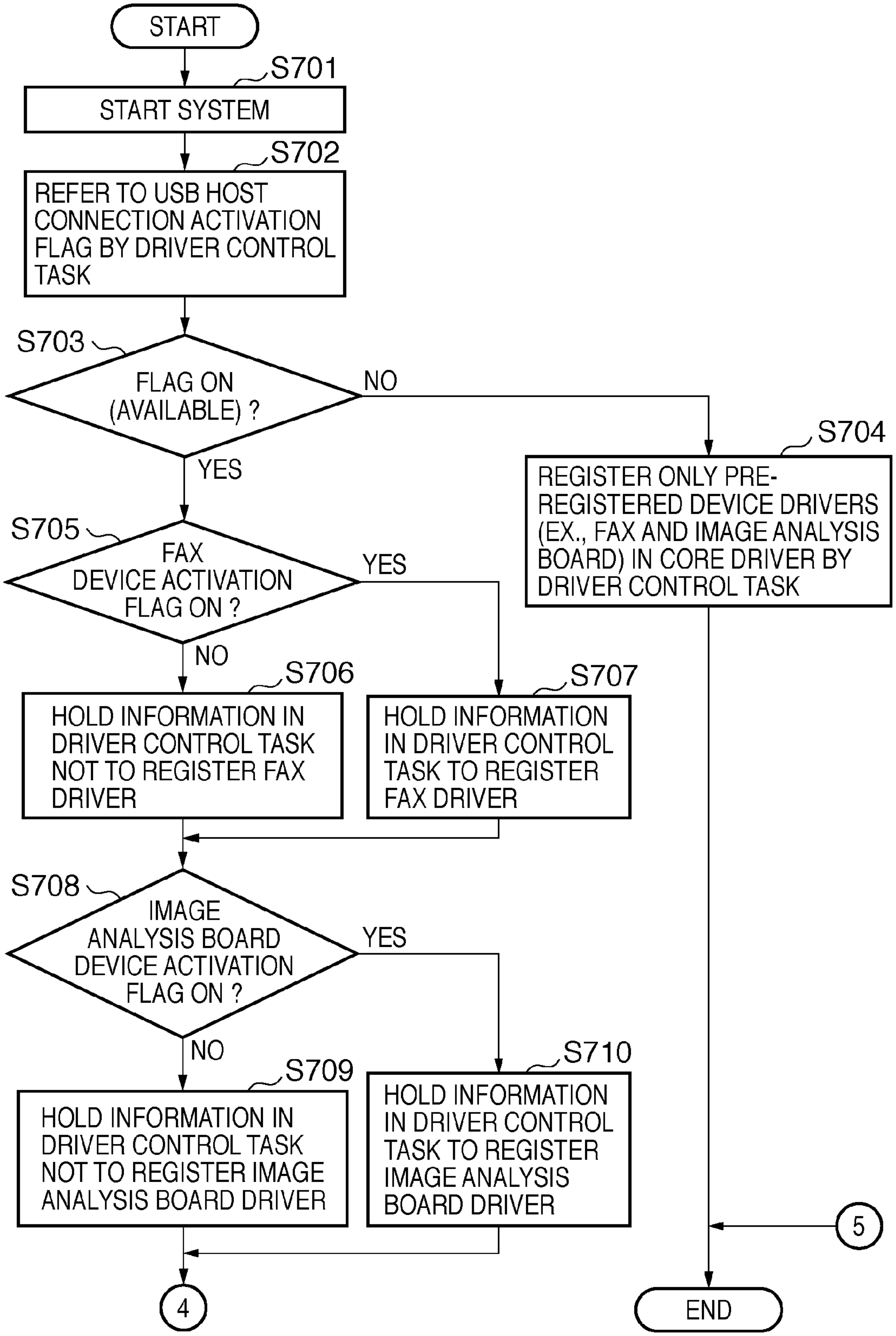

F I G. 18B
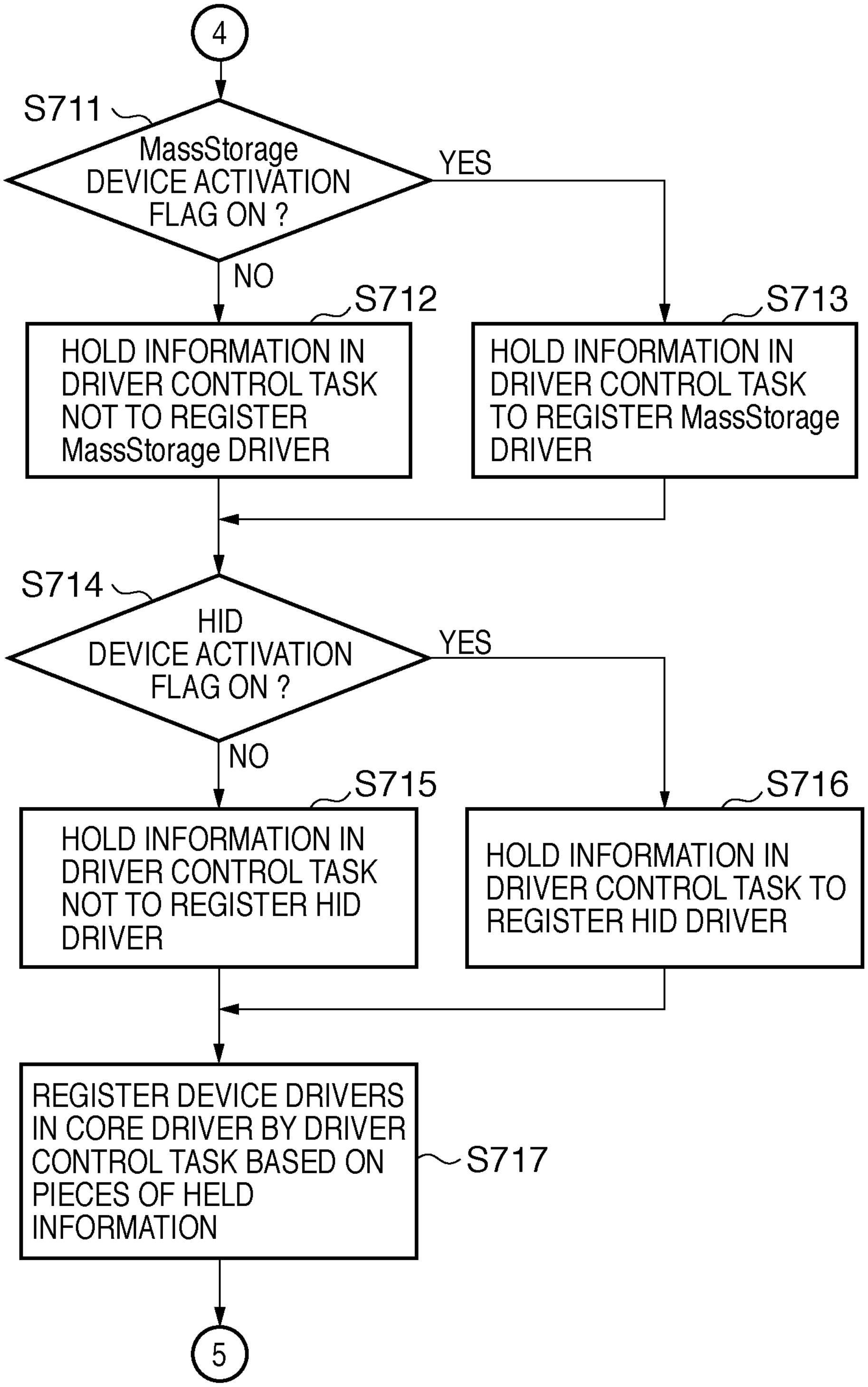

INFORMATION PROCESSING APPARATUS, CONTROL METHOD, AND PROGRAM

BACKGROUND OF THE INVENTION

1. Field of the Invention

The present invention relates to an information processing apparatus, control method, and program capable of extending hardware by an USB host connection.

2. Description of the Related Art

In this technical field, USB host connections are exploited for a variety of devices such as USB memories, keyboards, mouse devices, communication dongles, and printers. Even digital multifunction peripherals allow the connection of an increasing number of devices such as an USB memory, keyboard, and card reader, in the same way as PCs. One reason that USB host connections are popular is that the USB host connection is a general-purpose physical I/F (interface) and can be easily used and developed. However, because it is a general-purpose physical I/F, the USB host connection requires a security measure against, e.g., information leakage via an USB memory. Also, careless connection of an USB device may cause an adverse effect such as a virus on a host device. It is important to exclude connection of such a risky device.

As a conventional measure against these problems, the user inactivates a host controller chip which controls an USB host. For example, even Windows® and Linux®, which are general OSs (operating systems), allow disabling or deleting of a host controller driver in order to inactivate a host controller chip which controls all USB host connections. As another method, the user inactivates/deletes a device driver for controlling all kinds of USB devices. A conventional technique disclosed in Japanese Patent Laid-Open No. 2006-65859 uses a reserved bit present in an USB protocol. When an USB host device is connected, the host inactivates the connection port based on information of the reserved bit.

When using the method of disabling the whole host controller chip at once by a user, a disadvantage may be that even an internal USB host connection may be inactivated undesirably.

The method of disabling each device driver by a user takes much labour. In addition, it is often necessary to inactivate several device drivers at once for reasons of security. This method is therefore inconvenient.

In Japanese Patent Laid-Open No. 2006-65859, information needs to be added to a reserved bit, so a USB device to be connected also needs to cope with it. This method cannot exclude connection of an unintended device and is not proper, either.

SUMMARY OF THE INVENTION

The present invention provides an information processing apparatus capable of USB-connecting a device compatible with USB connection, the apparatus comprising: a management unit configured to manage driver information representing whether to activate a device driver when the device is USB-connected; a device information acquisition unit configured to acquire device information of the device; and a setting unit configured to set up the driver under control of an USB core driver to control the device using a device driver corresponding to the driver information when the driver information matches the device information.

An advantage of the present invention is that a measure for security can be taken in advance, and convenient control of the USB host connection can be implemented without disabling a necessary connection within a system. In addition to this mechanism, activation/inactivation can be controlled for each device driver, achieving a more convenient USB host connection. Further in addition to this mechanism, activation/inactivation can be controlled for each physical I/F of an information processing apparatus, providing a more convenient USB host connection.

The present invention can appropriately manage activation/inactivation of interface connection of a device.

Another advantage of the present invention is that the system can inactivate several USB host connections at once. However, a device which needs to remain activated (e.g., a device which needs to be connected internally) can be used exceptionally.

Also, connection of an unintended device can be excluded regardless of compatibility on the USB device side.

Further features of the present invention will become apparent from the following description of exemplary embodiments with reference to the attached drawings.

BRIEF DESCRIPTION OF THE DRAWINGS

FIG. 3 is a block diagram showing the relationship between a core driver, a device driver, and an USB device in the embodiment;

FIG. 7 is a diagram for explaining USB protocol information in the embodiment;

FIGS. 15A and 15B are flowcharts for explaining an example of a processing sequence in a first embodiment of the invention;

FIGS. 18A and 18B are flowcharts for explaining an example of a processing sequence in the second embodiment;

DESCRIPTION OF THE EMBODIMENTS

First Embodiment

The first embodiment will be explained below in which a necessary device can be connected even when the USB host connection is inactivated.

<Hardware Configuration>

Figure 1:
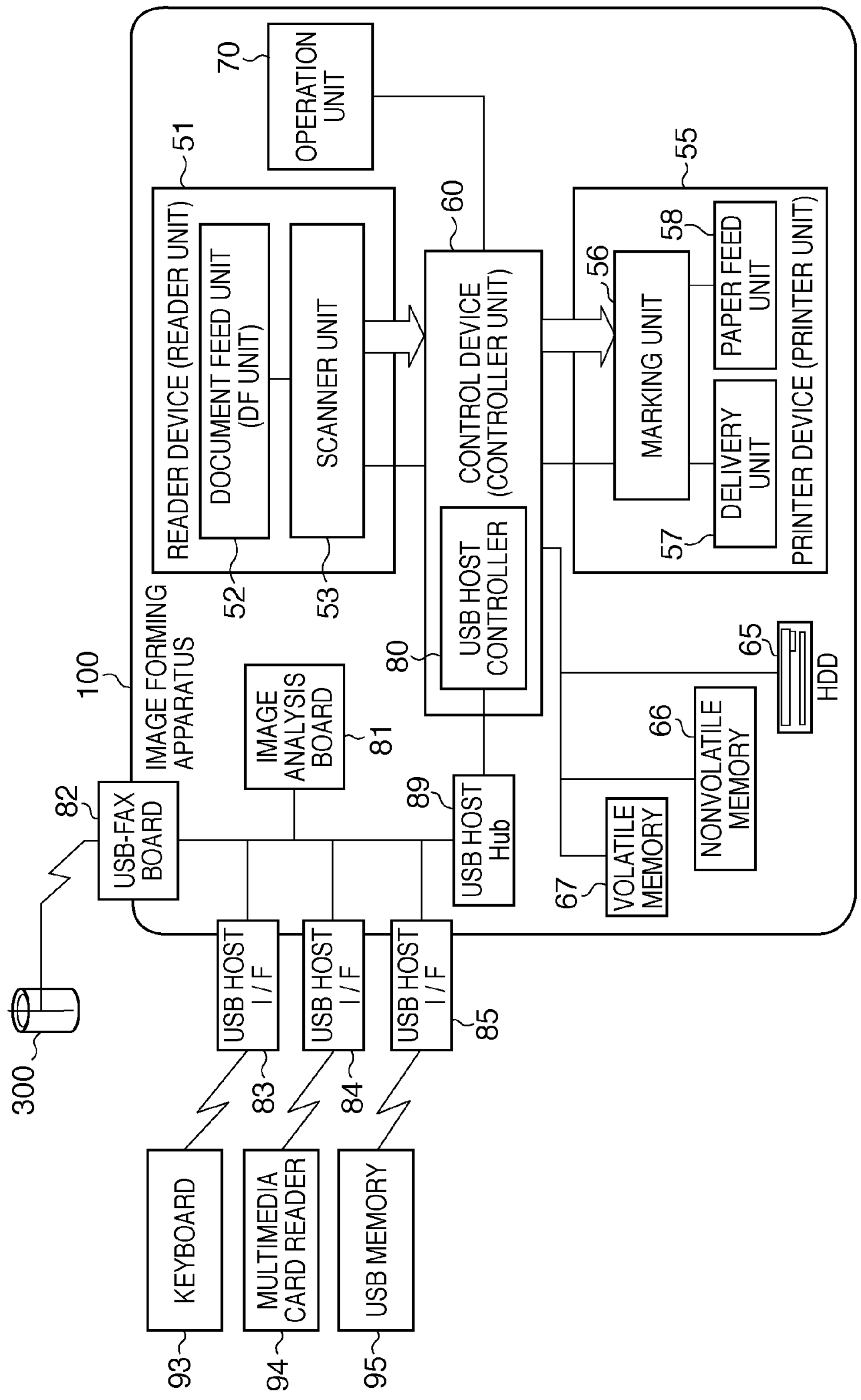
FIG. 1 is a block diagram for explaining an example of a system configuration in an embodiment of the present invention.

A system configuration according to the embodiment will be explained with reference to FIG. 1. An image forming apparatus 100 is an example of an information processing apparatus. A reader unit 51 has a function of optically reading an original image (e.g. supplied on a sheet of paper) and converting it into image data. The reader unit 51 includes a scanner unit 53 having a function of reading an original, and a document feed unit 52 having a function of conveying an original sheet. Depending on the device configuration, the document feed unit 52 may not be necessary (in such a case, an original could be set on a platen glass and read by a sensor, thus not requiring a document feed unit). A printer unit 55 has a function of conveying a print sheet having on it printing image data as a visible image, and delivering the print sheet to outside the apparatus. The printer unit 55 includes a paper feed unit 58 having a plurality of kinds of print sheet cassettes, a marking unit 56 which transfers and fixes image data on a print sheet, and a delivery unit 57 which sorts and staples printed sheets and delivers them to outside the apparatus. A control device 60 is electrically connected to the reader unit 51 and printer unit 55. The control device 60 provides a copy function of controlling the reader unit 51 to read image data of an original and controlling the printer unit 55 to output the image data on a printed sheet.

An operation unit 70 includes a liquid crystal display, a touch panel input device adhered on the liquid crystal display, and a plurality of hard keys. The operation unit 70 provides a user I/F which allows a user to perform various operations. A signal input from the touch panel or hard key is transferred to the control device 60. The liquid crystal display displays image data sent from the control device 60. A Box function (document storage function) is also provided to save an original read by the reader unit 51 as a document in an HDD 65. The Box function includes a function of storing a document and a function of printing a stored document. The control device is also connected to a volatile memory 67 and a non-volatile memory 66. The volatile memory 67 stores temporary data, and the non-volatile memory 66 stores permanent data. The non-volatile memory 66 stores programs and set values of which data needs to be held even upon normally restarting the system. The control device 60 includes a chip called an USB host controller 80. The USB host controller 80 manages all communications with USB host connections. For example, the system architect connects an USB host hub 89 to the USB host controller 80. The connection of the USB host hub 89 externally provides host I/Fs 83, 84, and 85, which serve as external USB physical interfaces. The user can connect devices such as a keyboard 93, multimedia card reader 94, and USB memory 95 to these physical I/Fs, thereby extending the hardware. This also applies to other USB devices such as an IC card reader and communication dongle. In some cases, the USB host hub 89 is connected to an internal USB device. For example, the system architect connects an USB-FAX board 82 for connecting an external fax line 300, and an image analysis board 81 to the USB host controller 80. Then, the system can execute the fax function and image analysis function.

<Internal Configuration>

Figure 2:
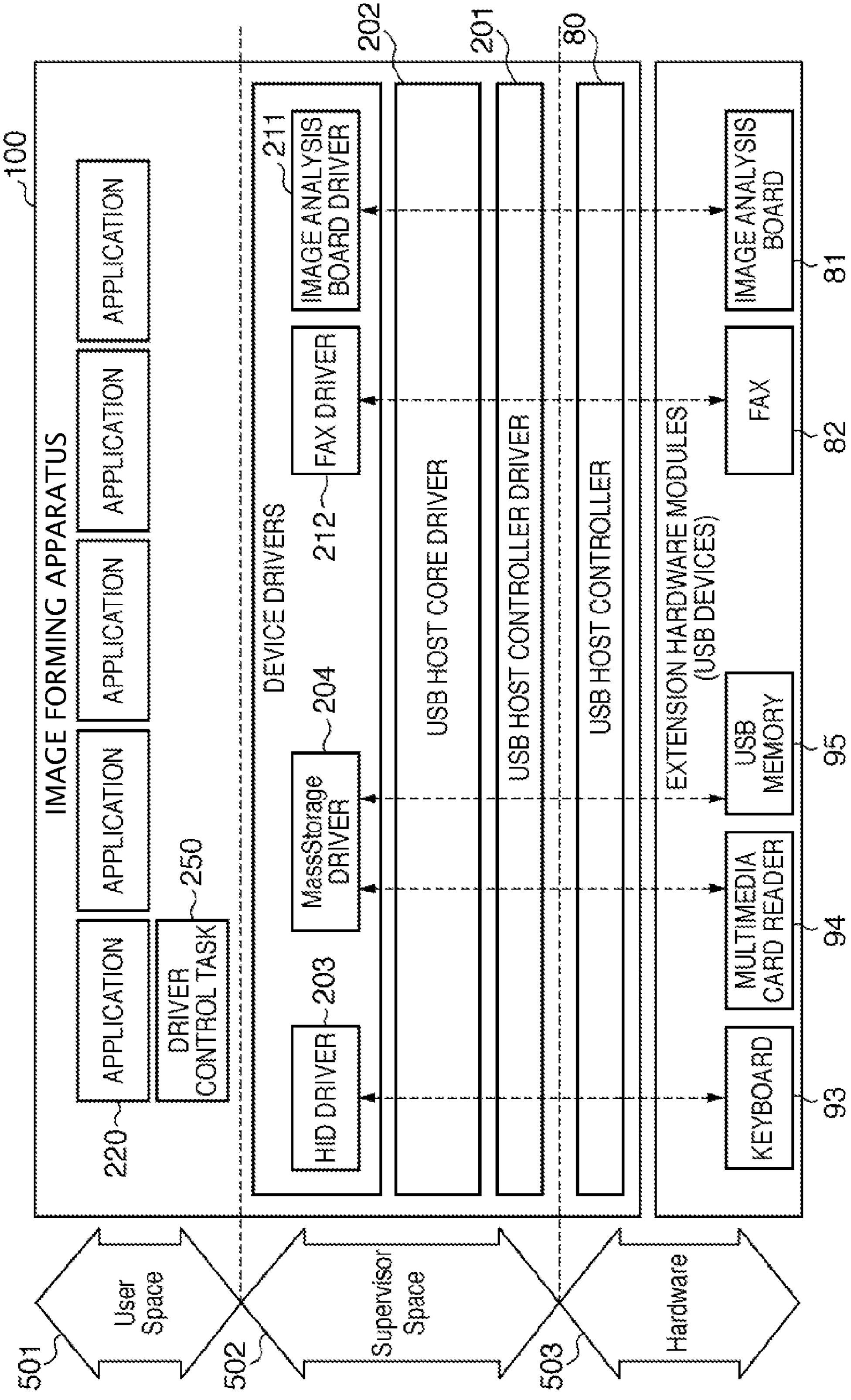
FIG. 2 is a block diagram showing a hierarchical structure including software and hardware in the embodiment.

FIG. 2 is a block diagram showing the structure of the control device 60 and extension hardware modules. Layers 501 and 502 are software layers, and a layer 503 is a hardware layer. The layer 501 is generally called a user space or userland, and does not have any special right to the system. Modules belonging to this layer cannot directly control an external device. The layer 502 is generally called a supervisor space, kernel mode, or privileged mode, and has a special right to the system. Modules belonging to this layer can directly control an external device.

The extension hardware modules are the keyboard 93, multimedia card reader 94, USB memory 95, USB-FAX board 82, image analysis board 81, and the like. For example, the user connects such modules (e.g., the keyboard 93, multimedia card reader 94, and USB memory 95) to the physical USB host I/Fs 83, 84, and 85 shown in FIG. 1. Alternatively, the system architect internally connects such modules (e.g., the USB-FAX board 82 and image analysis board 81). The USB host controller 80 controls all of the USB host I/Fs. The USB host controller 80 manages all communications for performing USB communication between a device (peripheral device) connected to the USB host and the main body of the image forming apparatus 100. The USB host controller 80 can execute communication complying with respective standards such as USB standard 1.x and USB standard 2.0. The USB standard 1.x includes UHCI (Universal Host Controller Interface) and OHCI (Open Host Controller Interface). As for the USB standard 2.0, EHCI (Enhanced Host Controller Interface) is recognized as a universal standard. Most information devices generally support either UHCI or OHCI communication, and EHCI communication.

The following modules present on the software layer are stored in the non-volatile memory 66, read out by a CPU (not shown), and run. The supervisor space 502 contains an USB host controller driver 201, USB host core driver 202, HID driver 203, Mass Storage driver 204, image analysis board driver 211, and fax driver 212. The user space 501 contains a driver control task 250 and application 220.

The USB host controller driver 201 controls the USB host controller 80 and implements communication at an USB protocol level. The USB host core driver (to be referred to as a core driver hereinafter) 202 is positioned on a layer above the USB host controller driver 201. Device drivers are positioned on a layer above the core driver 202. The device driver is software necessary for the application 220 present in the upper-layer user space to communicate with an USB host device. The device drivers are as follows. The HID driver 203 controls a general-purpose HID (Human Interface Device) such as a keyboard or a mouse. In general, the HID driver 203 issues a key strike and a mouse gesture as events to an upper-layer application. The Mass Storage driver 204 controls a general-purpose storage device such as an USB memory or card device. The Mass Storage driver 204 normally provides the function of a storage device such as an USB memory to an application via a file system (not shown) built above the Mass Storage driver 204. The fax driver 212 controls the vendor-specific USB-FAX board 82. The fax driver 212 executes, for example, software processing based on the fax standard in order to perform fax communication with the outside via the fax line 300. The image analysis board driver 211 controls a vendor-specific image analysis board. By way of image analysis, the image analysis board driver 211 performs, for example, software processing including an instruction and management to analyze scanned data.

The core driver 202 is particularly relevant to the present invention and will be explained in detail. In general, the core driver 202 holds device driver information and decides a device driver which is to handle a connected device.

More specifically, the core driver 202 has the following functions:

1) The core driver 202 receives registration of a device driver from an upper-layer module, and holds device driver information in a table. A device driver can be registered at any time and is added to the table, as needed. The volatile memory 67 generally holds the table.

2) The core driver 202 detects connection of an USB device, and acquires information of the connected USB device. The volatile memory 67 normally holds the acquired information.

3) When an USB host device is connected or a device driver is registered, the core driver 202 compares the table with information of the connected USB device. The core driver 202 then decides which device driver is to handle the connected USB device.

4) The core driver 202 receives a device driver deletion request and deletes corresponding device driver information from the table.

5) The core driver 202 detects disconnection of an USB device. Finally, the core driver 202 stops handling of a disconnected USB device.

The core driver 202 in the present invention is especially concerned with the first, second, and third functions.

The driver control task 250 registers device drivers in the core driver 202. When the system of the image forming apparatus 100 starts, the driver control task 250 is read out from the non-volatile memory 66 by the CPU (not shown) and runs.

<Sequence of Device Driver Registration>

FIG. 3 is a diagram for explaining registration of device drivers in the core driver 202 by the driver control task 250. FIG. 3 shows a case in which the USB host connection is active. The following modules are stored in the non-volatile memory 66, read out by the CPU (not shown), and run. These modules are the USB host controller driver 201, core driver 202, HID driver 203, Mass Storage driver 204, image analysis board driver 211, FAX driver 212, and driver control task 250.

The driver control task 250 holds a list of device drivers in the non-volatile memory 66. This list is a driver list in activation of the USB host and describes all device drivers. This list holds pieces of information on the HID driver 203, Mass Storage driver 204, fax driver 212, and image analysis board driver 211, as represented by a list 601. At this time, the core driver 202 builds a table in the registration order. In many cases, an upper-layer module (driver control task 250 in the present invention) registers a vendor-specific driver first and then a general-purpose driver. As the operation of the core driver 202 upon connecting an USB device, the core driver 202 scans the table in the registration order. Thus, a driver to be applied first needs to be registered first. This is because if a general-purpose driver is registered first, it will be used first, and as it can be used in place of a special driver, the special driver such as a vendor-specific driver risks not being used. In the embodiment illustrated, the driver control task 250 holds the fax driver and image analysis board driver first, which are vendor-specific drivers, and then the Mass Storage driver and HID driver, which are general-purpose drivers, in the order shown in the list 601. A list 602 exemplifies direct value and holds driver names. Especially for a vendor-specific driver, the vendor ID and product ID are often registered to more finely specify a device to be handled. To register pieces of information on the vendor ID and product ID, the driver control task 250 holds them in the list 602. The non-volatile memory 66 holds these pieces of information permanently even after the restart of the system. The driver control task 250 reads out the list and registers it in the core driver 202. After the registration, a table is built in the core driver 202, which may take the form of table 603. This table 603 is built with the drivers in the following order: registered fax driver 212, image analysis board driver 211, Mass Storage driver 204, and HID driver 203. A table 604 exemplifies direct value, and pieces of information from the list 602 are directly registered in the core driver 202 as table 604.

Figure 4:
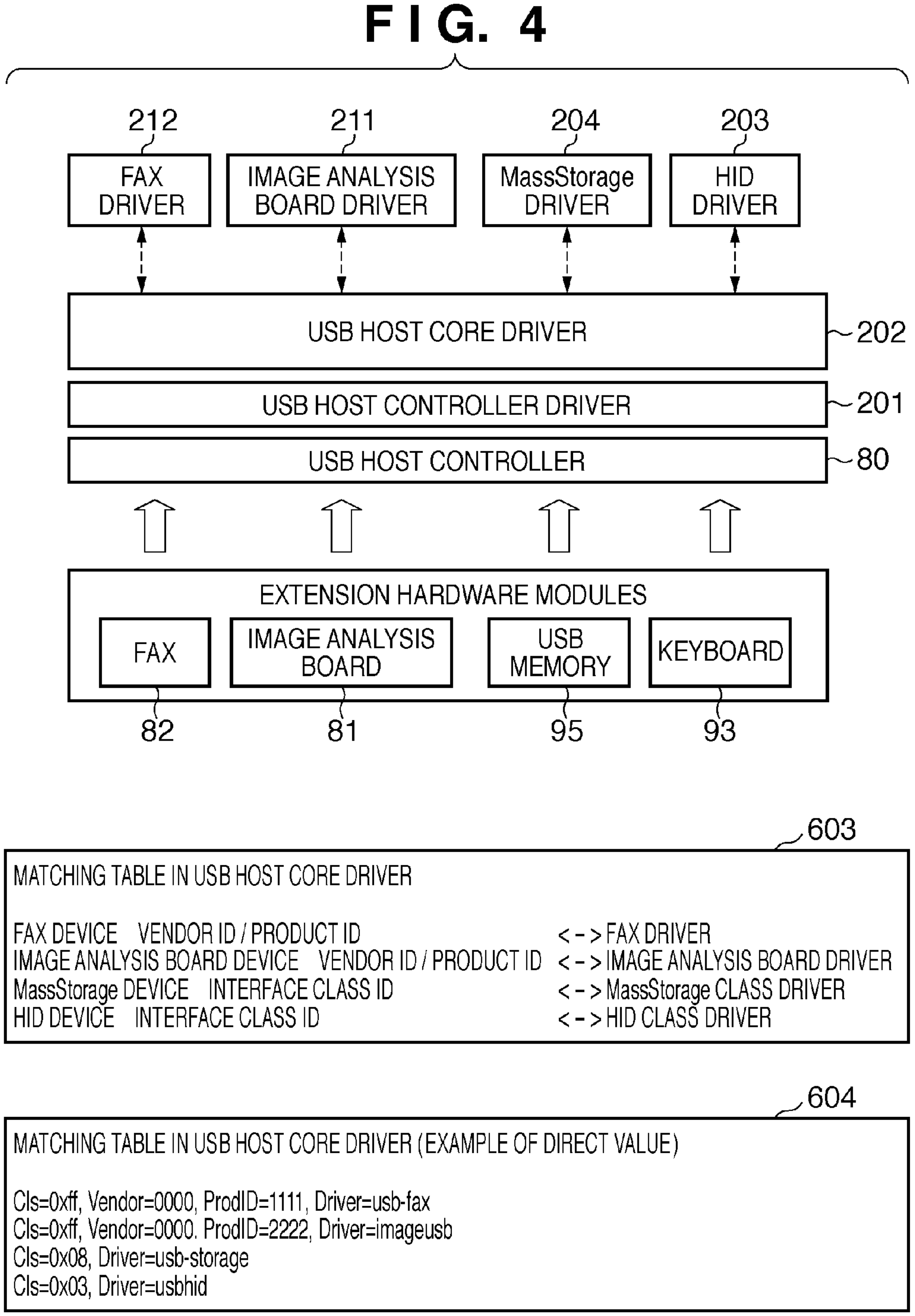
FIG. 4 is a block diagram showing the relationship between a core driver, a device driver, and an USB device in the embodiment.

FIG. 4 is a diagram for explaining a device driver to be used upon connection of an USB device. FIG. 4 shows a case in which the USB host connection is active. The following modules are stored in the non-volatile memory 66, read out by the CPU (not shown), and run. These modules are the USB host controller driver 201, image analysis board driver 211, fax driver 212, core driver 202, HID driver 203, and Mass Storage driver 204. The image analysis board 81, USB-FAX board 82, keyboard 93, and USB memory 95 are USB devices to be connected, and the USB host controller 80 is a chip which controls USB communication.

Upon connecting an USB device, the core driver 202 compares registered information with information of the USB device in the order of registration in the table held in the core driver 202. The core driver 202 sequentially scans the items in the table, and when it detects, in the table, information matching the information of the connected device, associates the driver and device. If there is no matching information in the table, the USB device cannot be handled. When this happens, a driver capable of handling all devices may be prepared and registered at the bottom of the table. Alternatively, a message may be displayed to request a driver from the user.

The present embodiment uses the table shown in FIG. 3. For example, the fax driver 212, image analysis board driver 211, Mass Storage driver 204, and HID driver 203 are registered in the table 603 in the order named. The table 604 exemplifies direct value. When an USB device is connected, the core driver 202 sequentially scans pieces of information registered in the table. For example, the core driver 202 acquires the class, vendor ID, and product ID values (e.g., Cls=0xff, Vendor=0000, ProdID=1111) of the USB-FAX board 82 on the first line of the table information. The core driver 202 compares the information with information of the class, vendor ID, and product ID of the connected USB device. If the compared pieces of information match each other, the FAX driver 212 handles this device (when the USB-FAX board 82 is connected, it is associated with the FAX driver 212 and the operation ends). If the compared pieces of information do not match each other, the core driver 202 acquires the class, vendor ID, and product ID values (e.g., Cls=0xff, Vendor=0000, ProdID=2222) of the image analysis board 81 on the second line of the table information.

The core driver 202 compares the information with information of the class, vendor ID, and product ID of the connected USB device. If the compared pieces of information match each other, the image analysis board driver 211 handles this device (when the image analysis board 81 is connected, it is associated with the image analysis board driver 211 and the operation ends). If the compared pieces of information do not match each other, the core driver 202 acquires the class value (e.g., Cls=0x08) of a Mass Storage device (USB memory 95) on the third line of the table information. The core driver 202 compares the information with information of the class of the connected USB device. If the compared pieces of information match each other, the Mass Storage driver 204 handles this device (when the USB memory 95 is connected, it is associated with the Mass Storage driver 204 and the operation ends). If the compared pieces of information do not match each other, the core driver 202 acquires the class value (e.g., Cls=0x03) of an HID device (keyboard 93) on the fourth line of the table information. The core driver 202 compares the information with information of the class of the connected USB device. If the compared pieces of information match each other, the HID driver 203 handles this device (when the keyboard 93 is connected, it is associated with the HID driver 203 and the operation ends). If the compared pieces of information do not match each other, the operation ends without associating the connected USB device to any driver. Instead of ending the operation, a driver which can be associated with all devices may be prepared and registered at the bottom of the table. In this case, a device is always associated with a driver.

The image forming apparatus has been disclosed as an example of an information processing apparatus USB-connected to a device compatible with USB connection. The core driver 202 manages driver information representing whether to activate a driver upon USB connection. The core driver 202 functions as a device information acquisition module which acquires USB device information of a device.

When driver information and device information match each other, the core driver 202 makes the following setting to control a device using a device driver corresponding to the driver information. More specifically, the core driver 202 functions as an example of a setting module which sets up a device driver under the control of an USB core driver.

Figure 5:
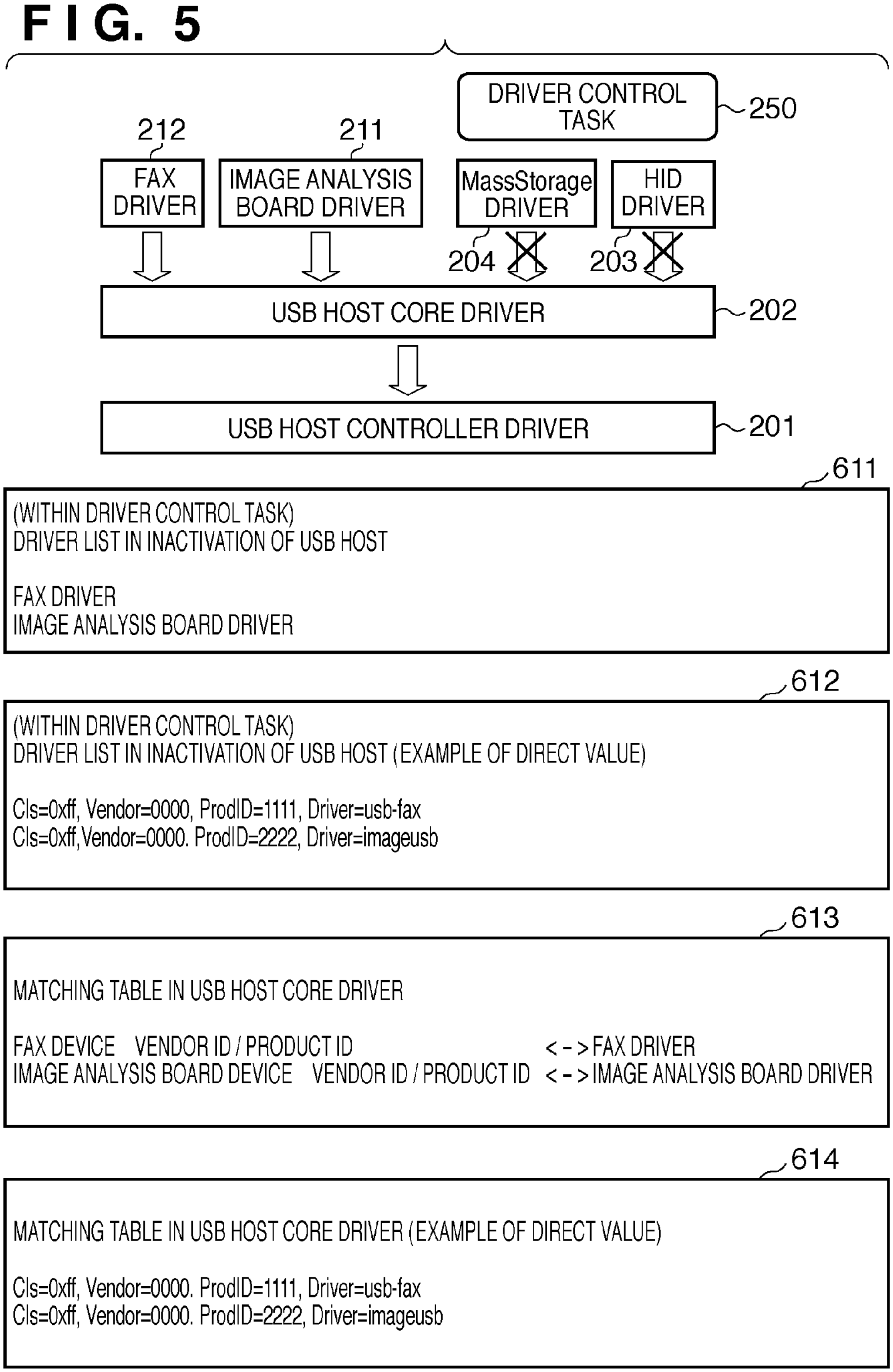
FIG. 5 is a block diagram showing the relationship between a core driver, a device driver, and an USB device in the embodiment.

FIG. 5 is a diagram for explaining registration of device drivers in the core driver 202 by the driver control task 250. FIG. 5 shows a case in which the USB host connection is invalid. The following modules are stored in the non-volatile memory 66, read out by the CPU (not shown), and run. These modules are the USB host controller driver 201, core driver 202, image analysis board driver 211, fax driver 212, HID driver 203, Mass Storage driver 204, and driver control task 250. The HID driver 203 and Mass Storage driver 204 are taken to be inactivated (shown by crosses over the communication arrows in FIG. 5).

The driver control task 250 holds a list of device drivers in the non-volatile memory 66. This list is a driver list in inactivation of the USB host and describes device drivers for devices to be used even in inactivation of the USB host. This list describes the USB-FAX board 82 and image analysis board 81 because they internally use the USB host (they are available even in the case of inactivation of the USB host). Hence, this list holds pieces of information on the FAX driver 212 and image analysis board driver 211 (it does not hold pieces of information on the HID driver 203 and Mass Storage driver 204), as shown in list 611. In the embodiment, the driver control task 250 holds the fax driver and image analysis board driver in the list in the order named. A list 612 exemplifies direct value and holds driver names. To register pieces of information on the vendor ID and product ID, the driver control task 250 holds them in the list. The non-volatile memory 66 holds these pieces of information in such a way as to permanently hold them even after the restart of the system. The driver control task 250 reads out the list and registers it in the core driver 202. After the registration, a table is built in the core driver 202, shown as table 613. At this time, the table is built with the following order: registered fax driver then image analysis board driver. A table 614 exemplifies direct value, and pieces of information in the list 612 are directly registered.

Figure 6:
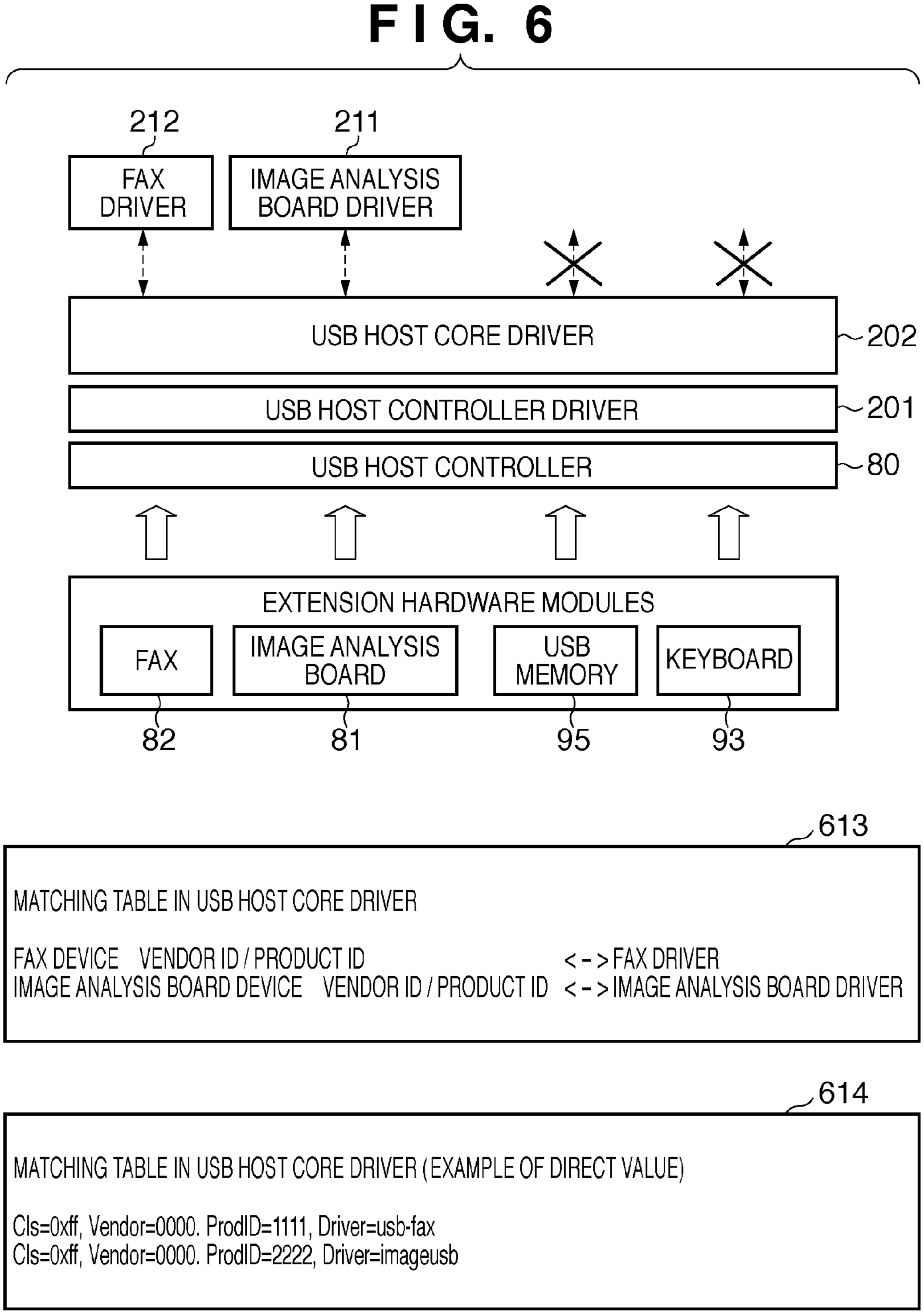
FIG. 6 is a block diagram showing the relationship between a core driver, a device driver, and an USB device in the embodiment.

FIG. 6 is a view for explaining a device driver to be used upon connection of an USB device. FIG. 6 shows a case in which the USB host connection is invalid. The following modules are stored in the non-volatile memory 66, read out by the CPU (not shown), and run. These modules are the USB host controller driver 201, image analysis board driver 211, fax driver 212, core driver 202, HID driver 203, and Mass Storage driver 204. The HID driver 203 and Mass Storage driver 204 are taken as being inactivated and so are not illustrated in FIG. 6. The image analysis board 81, USB-FAX board 82, keyboard 93, and USB memory 95 are USB devices to be connected, and the USB host controller 80 is a chip which controls USB communication.

As an operation upon connecting an USB host, the core driver 202 compares registered information with information of an USB device in order of registration in the table held in the core driver 202. The core driver 202 sequentially scans the table, and when it detects information matching the USB device in the table, associates the driver and device. If there is no matching information in the table, the USB device cannot be handled.

The present embodiment uses the table registered in FIG. 5. For example, the fax driver 212 and image analysis board driver 211 are registered in the table 613 in the order named. The table 614 exemplifies direct value. When an USB device is connected, the core driver 202 sequentially scans pieces of information registered in the table. For example, the core driver 202 acquires the class, vendor ID, and product ID values (e.g., Cls=0xff, Vendor=0000, ProdID=1111) of the USB-FAX board 82 on the first line of the table information. The core driver 202 compares the information with information of the class, vendor ID, and product ID of the connected USB device. If the compared pieces of information match each other, the FAX driver 212 handles this device (when the USB-FAX board 82 is connected, it is associated with the fax driver 212 and the operation ends). If the compared pieces of information do not match each other, the core driver 202 acquires the class, vendor ID, and product ID values (e.g., Cls=0xff, Vendor=0000, ProdID=2222) of the image analysis board 81 on the second line of the table information. The core driver 202 compares the information with information of the class, vendor ID, and product ID of the connected USB device. If the compared pieces of information match each other, the image analysis board driver 211 handles this device (when the image analysis board 81 is connected, it is associated with the image analysis board driver 211 and the operation ends). If the compared pieces of information do not match each other, the operation ends without associating the connected USB device to any driver. In this case, for example, the use of the USB memory 95 or the like may be restricted for reasons of security. The USB host connection is inactivated to inhibit the use of the USB memory without registering a driver.

FIG. 7 shows USB protocol information 630 which is acquired from an USB device by the core driver 202 upon connecting the USB device. The information shown in FIG. 7 is information held in the volatile memory 67 by the core driver 202 when an USB device such as the image analysis board 81, USB-FAX board 82, keyboard 93, or USB memory 95 is connected to the image forming apparatus 100. Specifically, FIG. 7 shows information obtained when the USB memory 95 is connected.

Protocol information 630 contains various kinds of information. As an item concerning the present invention, the class of an USB device is described as Cls=08, like an item 631. The vendor ID and product ID are described as Vendor=04bb and ProdID=0c2a, like an item 632. The protocol information 630 may further contain information on a port physically connected to an USB device, like an item 650, and a product name, like an item 651.

An item 640 exhibits a driver name. When a USB device is connected, there is no information in the item 640. After the device driver and USB device are associated as shown in FIG. 4 or 6, the driver information is embedded in the device information (e.g., Driver=usb-storage 640).

<Operation Unit>

Figure 8:
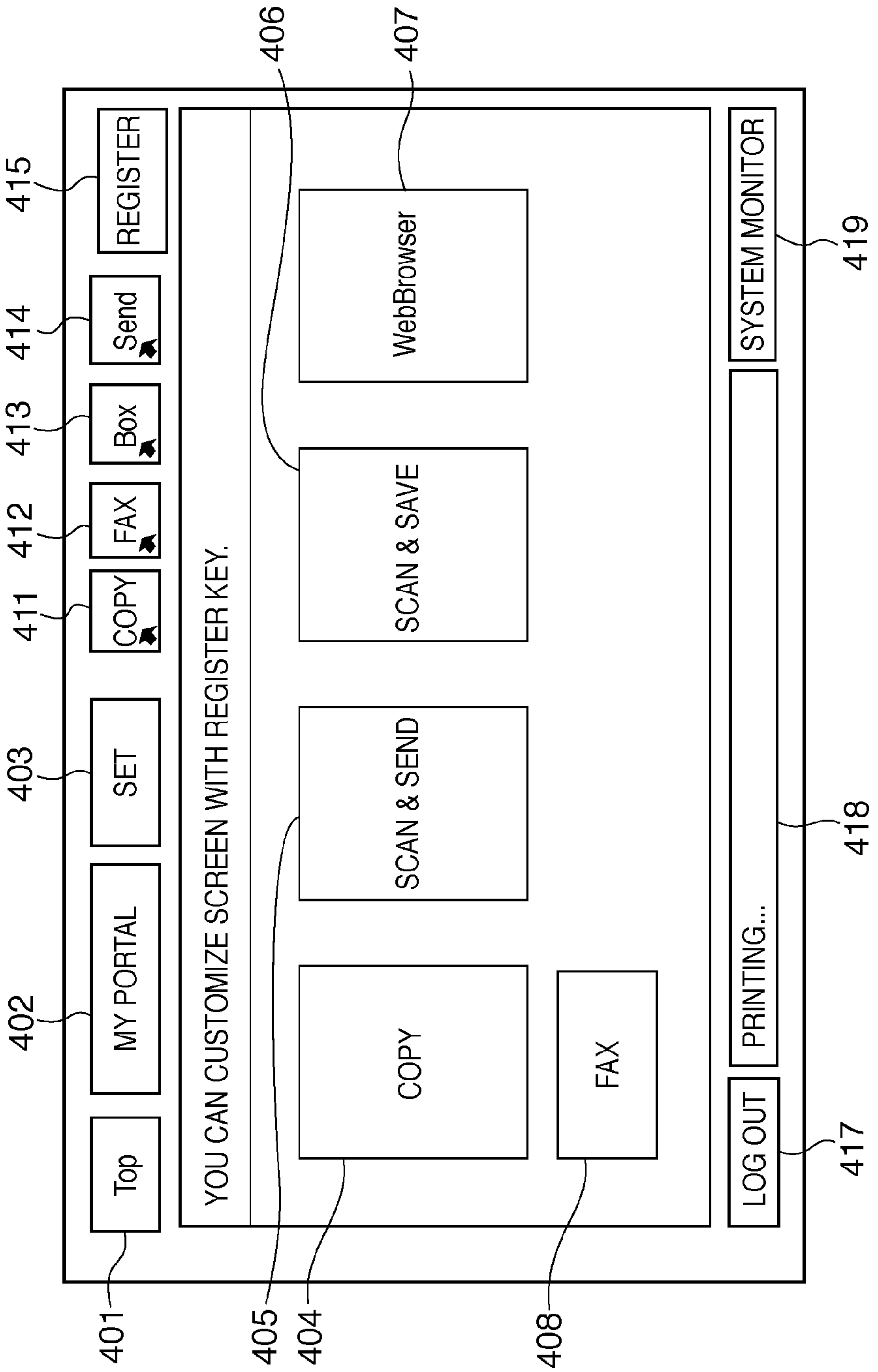
FIG. 8 is a view of a display exemplifying an operation unit in the embodiment.
Figure 9:
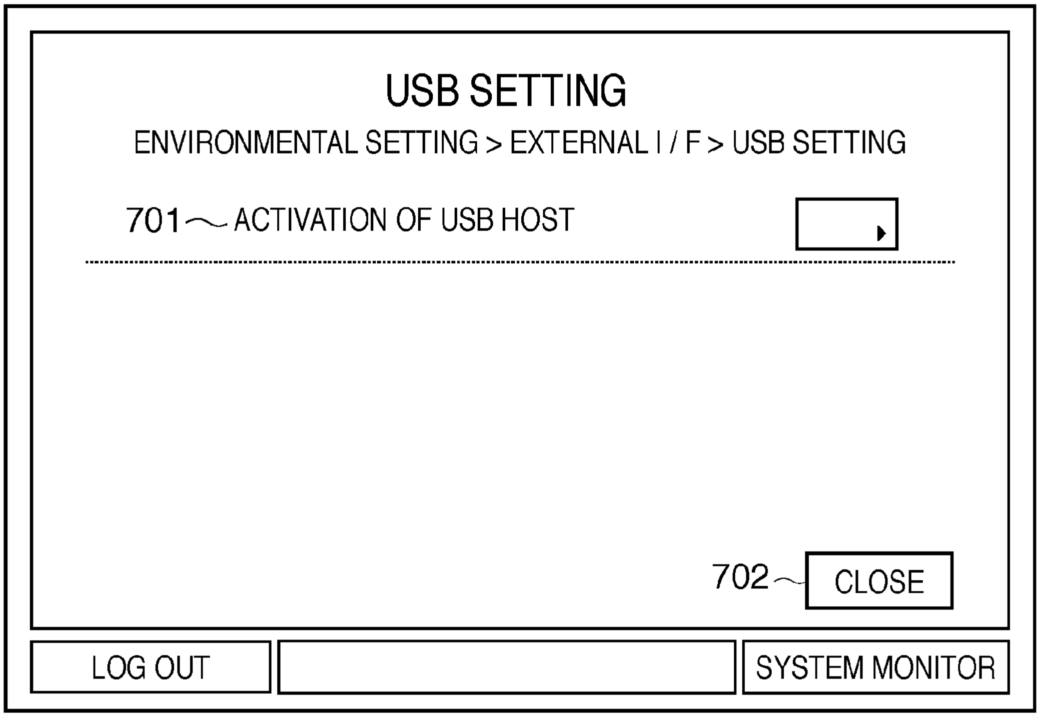
FIG. 9 is a view of a display exemplifying the operation unit in the embodiment.
Figure 10:
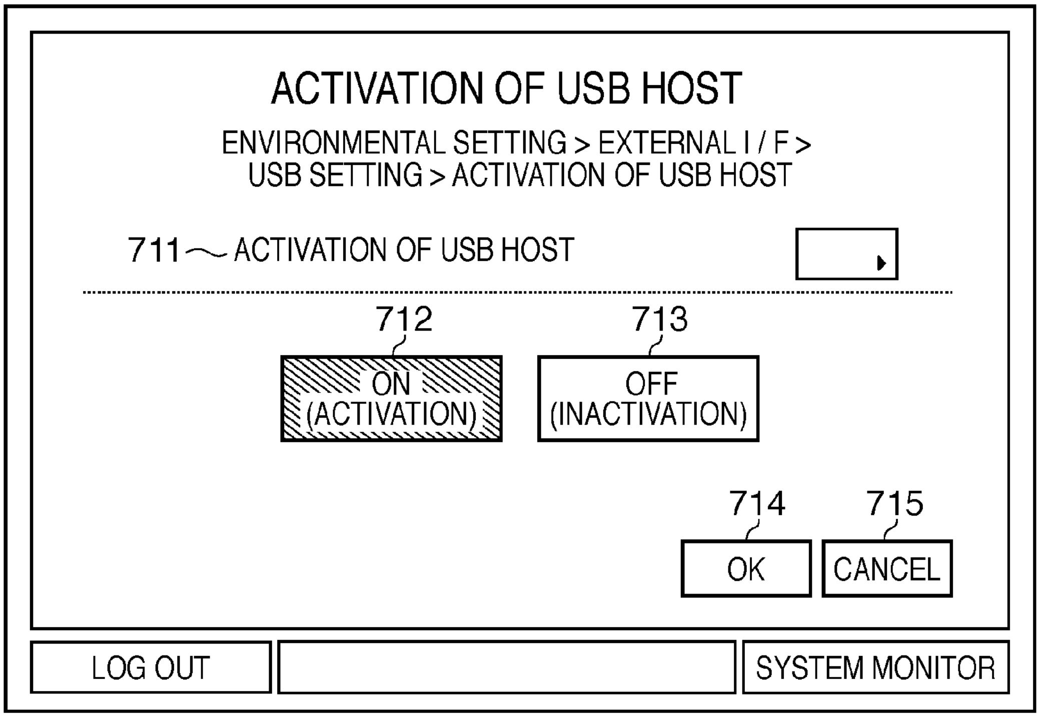
FIG. 10 is a view of a display exemplifying the operation unit in the embodiment.

FIGS. 8, 9, and 10 show the operation unit of the image forming apparatus 100. Basically, upon receiving a window operation from the user, software (not shown) of the operation unit performs processing and then displays the result. The software of the operation unit is held in the non-volatile memory 66, read out by the CPU (not shown), and runs. For example, the software of the operation unit executes rewrite of set values as shown in FIG. 11.

FIG. 8 shows a typical display on the operation unit. A top menu key 401 is prepared to return to a top menu window display (login window display is not shown). When the user presses a key such as the "my portal" key 402, a window bearing only information associated with a specific login user (e.g., information of a job input by the user) appears. A setting key 403 is used to display a window for setting environmental information, e.g., set values held in a device, and set values for each application and each user. By pressing the setting key 403, the user can also open an USB host connection activation setup window such as that to be described with reference to FIG. 9. The window in FIG. 8 has function keys 404 to 408 (referring to copy, scan & send, scan & save, Web Browser and fax respectively) and shortcut keys 411 to 414 (referring to copy, fax, box and send respectively). A register key 415 is used to edit a personalised window. A logout key 417 is used when the user wants to cancel a user login state. When the user presses the logout key 417, a top menu (not shown) appears. A status line 418 is an area for displaying information of a job in progress and warning information of consumables (e.g. toner). A system monitor key 419 is used to display a window which allows the user to confirm information of an active job list and job log list. This window is merely an example of the display, and the present invention is not limited to this.

FIG. 9 shows keys displayed upon pressing the setting key 403 in FIG. 8. When the user presses the setting key, various environmental settings become possible, but a description thereof will be omitted here. FIG. 9 shows an USB setup window. The environmental setting layer resides in a hierarchy "environmental setting>external I/F>USB setting". A window display key 701 is used to set activation of the USB host. When the user presses this key, a window as shown in FIG. 10 appears. When the user presses a close key 702, the window disappears and returns to the window display in FIG. 8. An USB host connection control instruction is accepted from the user via the window of FIG. 9. This window is merely an example of the display, and the present invention is not limited to this format.

Figure 11:
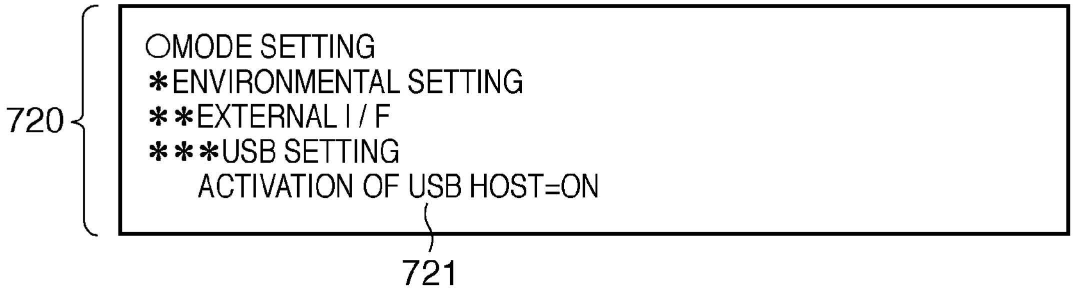
FIG. 11 is a diagram showing information held in an internal table in the embodiment.

FIG. 10 show a window that is displayed upon pressing a key to set activation of the USB host in FIG. 9, and FIG. 11 shows the associated internal data. An area 711 displays a setting item. The user can set activation/inactivation by pressing an ON (activation) key 712 or OFF (inactivation) key 713. An OK key 714 is used to finalize activation/inactivation. A cancel key 715 is used to cancel the current input setting (i.e., a change made at this time is not finalised). When the user presses the OK key 714 or the cancel key 715, the window returns to the window display in FIG. 9. When the user presses the OK key 714, information in an internal table shown in FIG. 11 is also updated. As the internal data, a table identical to the window hierarchy is held, as represented by a table 720. As the hierarchical information, the table has information "environmental setting>external I/F>USB setting", and information "activation of the USB host=ON" is held in an item 721. The information of the item 721 is held as an activation flag in the non-volatile memory 66. The actual setting becomes active in the system after the system restarts. The window in FIG. 10 is merely an example of the display, and the present invention is not limited to this format.

<USB Host Activation Sequence>

Figure 12:
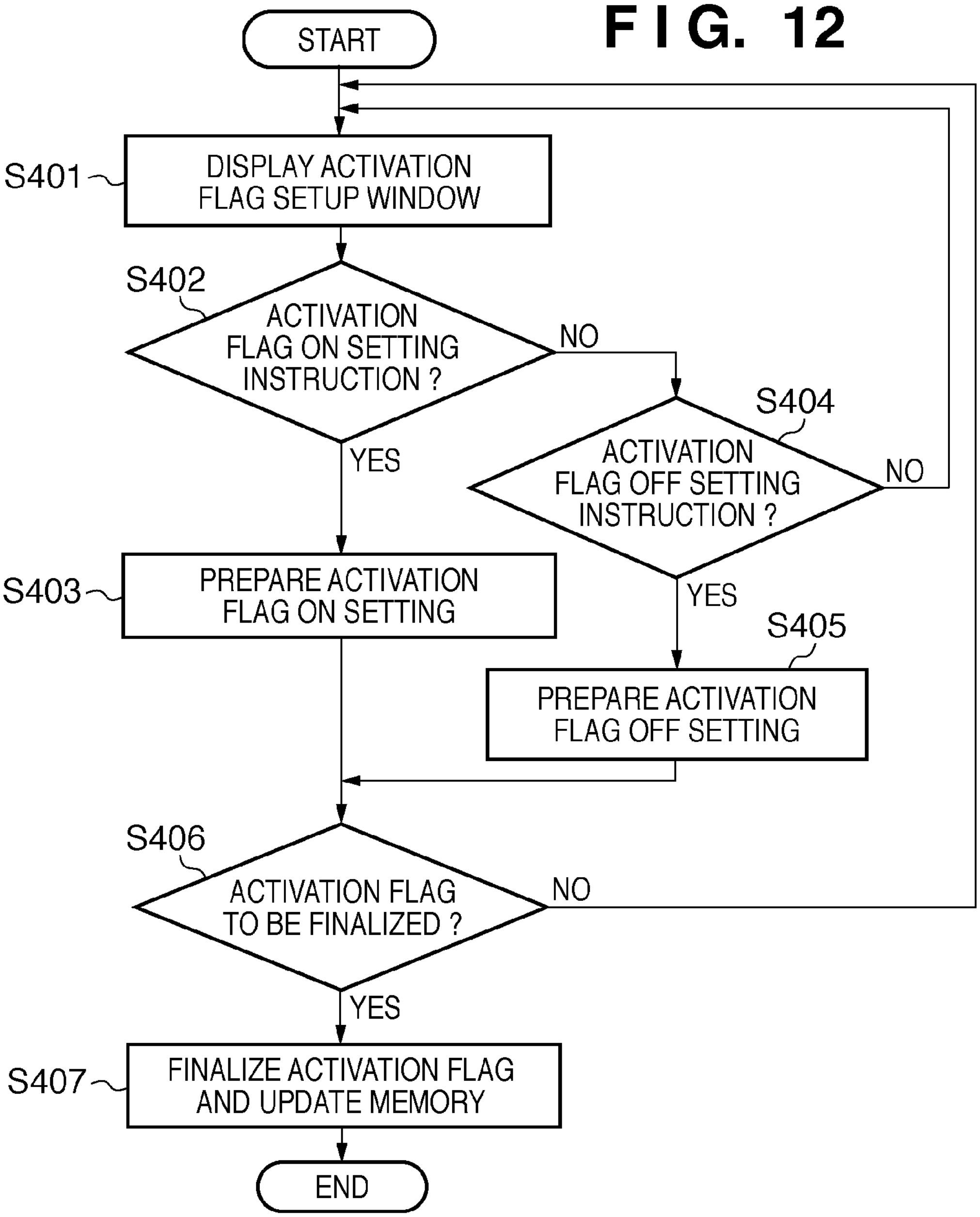
FIG. 12 is a flowchart for explaining an example of a processing sequence in the embodiment.

FIG. 12 is a flowchart illustrating a process when setting the ON/OFF state of an USB host connection activation flag serving as control information for controlling whether the USB host is usable. In S401, the USB host activation window in FIG. 10 is displayed in accordance with a user instruction. In S402, it is determined whether the user has pressed the ON (activation) key 712 in FIG. 10. If the user has pressed the ON (activation) key 712, the process advances to S403 to hold the control information in the volatile memory 67. If it is determined in S402 that the user has not pressed the ON (activation) key 712, the process advances to S404 to determine whether the user has pressed the OFF (inactivation) key 713. If the user has pressed the OFF (inactivation) key 713, the process advances to S405 to similarly hold the control information in the volatile memory 67. If it is determined in S404 that the user has not pressed the OFF (inactivation) key 713 either, the process returns to S401. In S406, it is determined whether to finalize or cancel control information of the ON (activation) key 712 or OFF (inactivation) key 713. If it is determined in S406 to finalize control information upon pressing the OK key 714, the activation flag is finalized in S407 to update the non-volatile memory 66 (the item 721 in FIG. 11). If it is determined in S406 that the user has pressed the cancel key 715, the process returns to S401. According to this sequence, a USB host connection control instruction is accepted from the user to make setting.

<Processing Sequence when System Starts>

Figure 13:
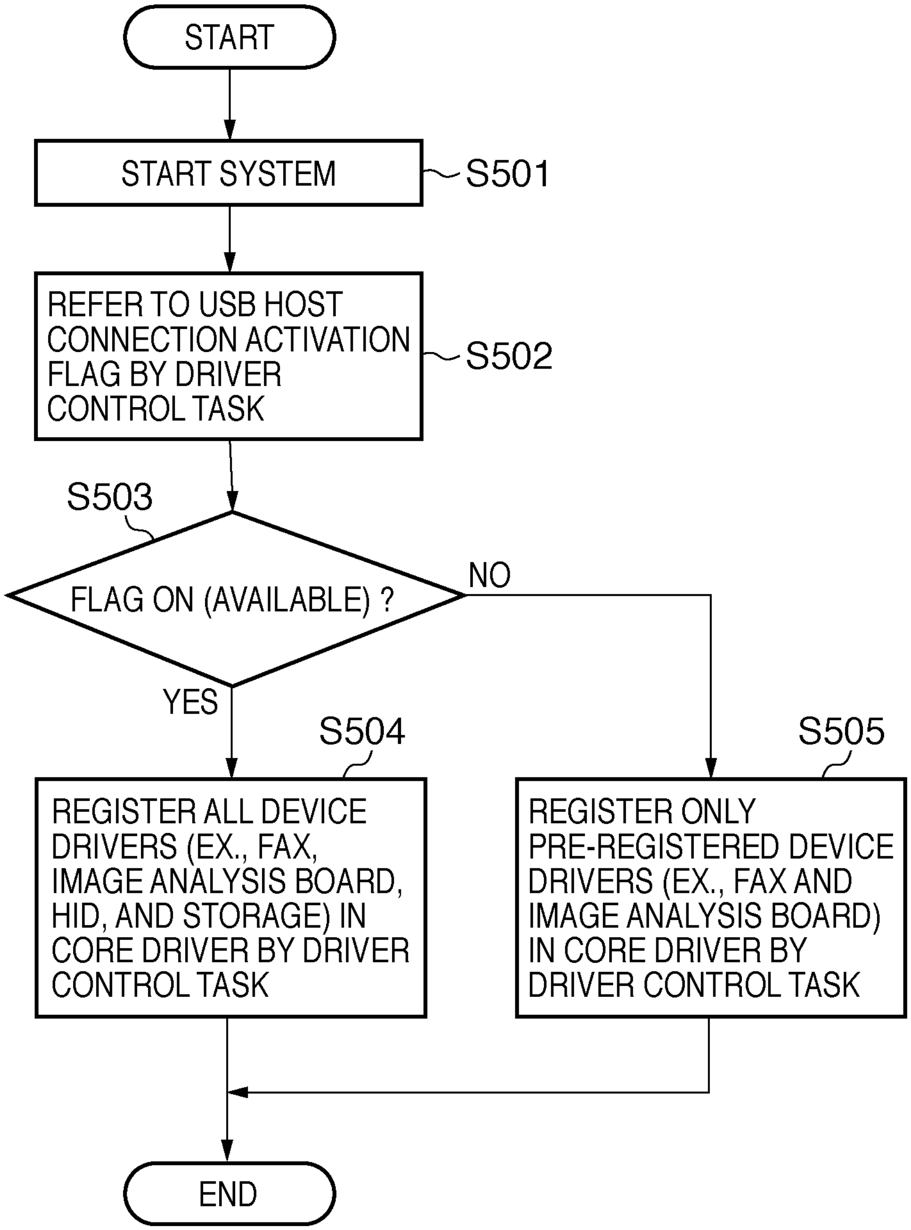
FIG. 13 is a flowchart for explaining an example of a processing sequence in the embodiment.

FIG. 13 is a flowchart of processing when the system of device driver registration starts. In S501, the system starts. In S502, the driver control task 250 refers to an USB host connection activation flag. The activation flag indicates ON/OFF setting of activation described with reference to FIGS. 10 and 11. If it is determined in S503 that the activation flag is ON, all device drivers are registered in the core driver 202 in S504. For example, these device drivers are the fax driver 212, image analysis board driver 211, Mass Storage driver 204, and HID driver 203 in the present embodiment. If it is determined in S503 that the activation flag is OFF, only pre-registered device drivers are registered in the core driver 202 in S505. In the present embodiment, only the fax driver 212 and image analysis board driver 211 are registered. The USB-FAX board 82 and image analysis board 81 use not general-purpose drivers but vendor-specific ones. Hence, a set of pieces of information of a class, vendor ID, and product ID, and driver information are registered as shown in FIG. 3. For example, Cls=0xff, Vendor=0000, ProdID=1111, and Driver=usb-fax are registered for a fax device. In contrast, the Mass Storage device and HID device can use general-purpose drivers, so only a class and driver information suffice to be registered (e.g., Cls=0x08 and Driver=usb-storage for the Mass Storage device). The driver information is merely an example.

<Processing Sequence when USB Device Connection is Detected>

Figure 14:
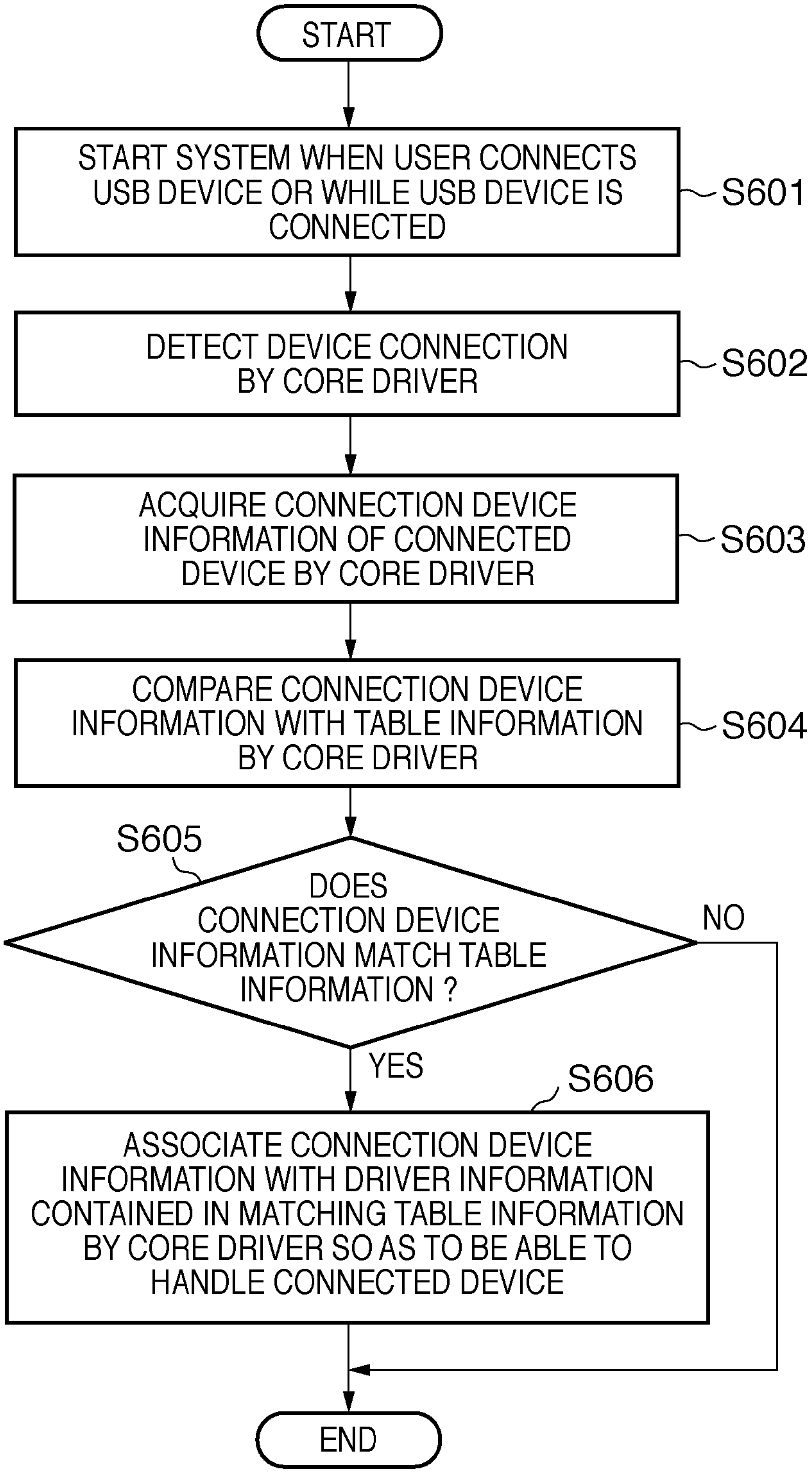
FIG. 14 is a flowchart for explaining an example of a processing sequence in the embodiment.

FIG. 14 is a flowchart of processing when an USB device (e.g., a keyboard, USB memory, or fax) is connected. In S601, the system starts when the user connects an USB device or when the processor starts while an USB device is connected, or when the USB device is acknowledged by the system. In S602, the core driver 202 detects the device connection. In S603, the core driver 202 acquires device information of the connected USB device. Information acquirable here is contained in the protocol information shown in FIG. 7. In S604, the core driver 202 scans the internal table and compares the acquired USB device information with information in the table. In S605, the core driver 202 determines whether the acquired device information matches the information in the table. If these pieces of information match each other, the core driver 202 associates in S606 the connected USB device information with driver information in the matching table information so that the device can be used. If the connected USB device information does not match any information in S605, the process ends without associating the connected USB device information with driver information. The USB device information is merely an example of device information.

<Processing Sequence (Details) when USB Device Connection is Detected>

Figure 15B:
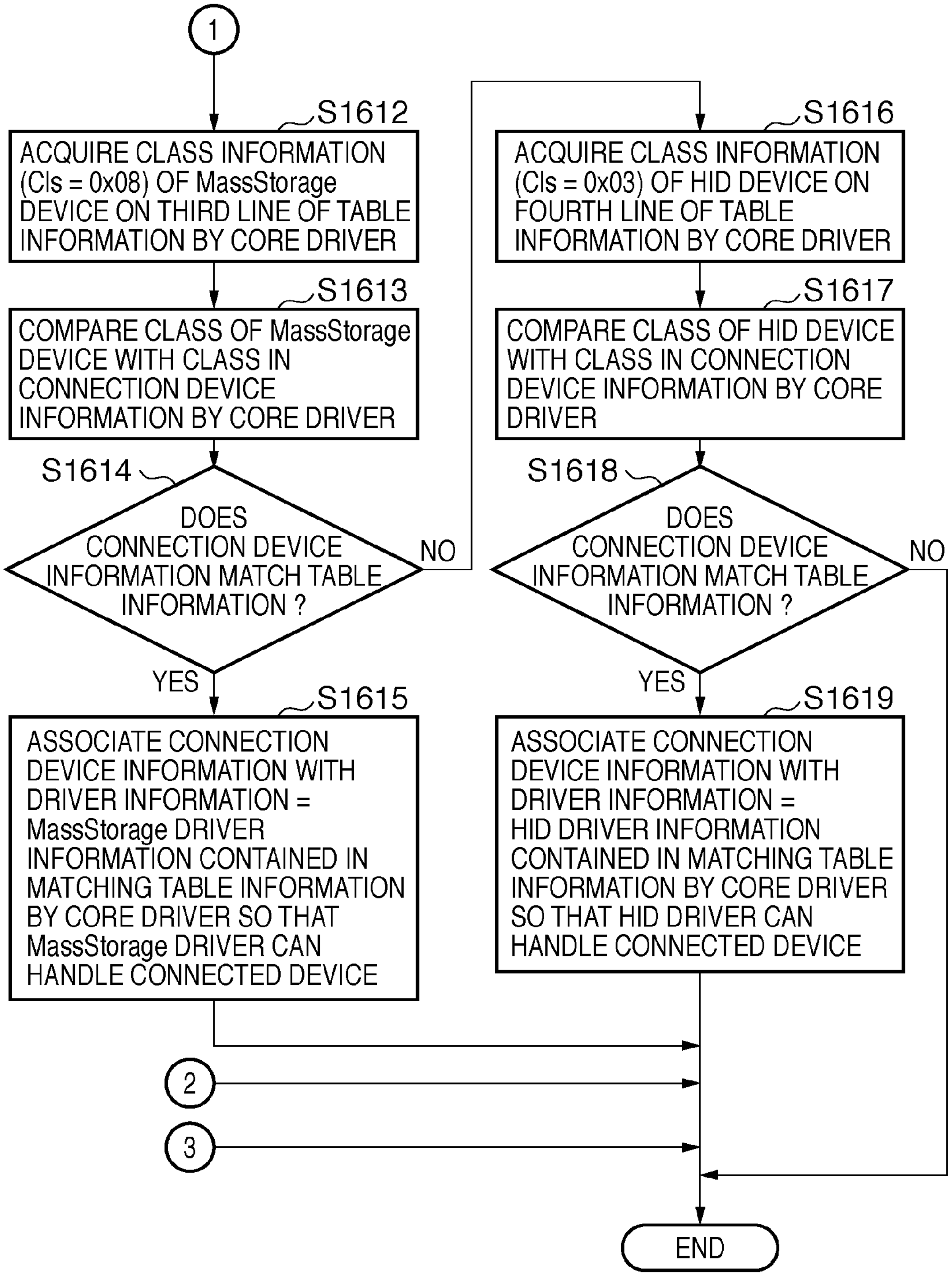

FIGS. 15A and 15B show the processing of the flowchart of FIG. 14 in more detail. In S1601, the system starts when the user connects an USB device or while an USB device is connected. In S1602, the core driver 202 detects the device connection. In S1603, the core driver 202 acquires device information of the connected USB device. Information acquirable here is contained in the protocol information shown in FIG. 7. S1604 and subsequent steps will explain processing of scanning a table in the core driver 202 by the core driver 202, comparing the acquired USB device information with information in the table, and associating it with matching information. In the embodiment, a fax device, image analysis board, and the like will be exemplified. However, devices are not limited to them, and the present invention is applicable to any device having an USB interface.

In S1604, the core driver 202 acquires the class, vendor ID, and product ID values (e.g., Cls=0xff, Vendor=0000, ProdID=1111) of the USB-FAX board 82 on the first line of the table information. In S1605, the core driver 202 compares the information with information of the class, vendor ID, and product ID of the USB device as represented by the protocol information of FIG. 7. In S1606, the core driver 202 determines whether these pieces of information match each other. If these pieces of information match each other, the process advances to S1607. The core driver 202 associates the connected USB device information with driver information contained in the matching table information (in this case, information of the fax driver 212). This association allows the fax driver 212 to handle the connected USB device. After that, the process ends.

If the core driver 202 determines in S1606 that the connected USB device information does not match the registered information of the USB-FAX board 82, the process advances to S1608 to compare the connected USB device information with the next table information. In S1608, the core driver 202 acquires the class, vendor ID, and product ID values (e.g., Cls=0xff, Vendor=0000, ProdID=2222) of the image analysis board 81 on the second line of the table information. In S1609, the core driver 202 compares the information with information of the class, vendor ID, and product ID of the USB device as represented by the protocol information of FIG. 7. In S1610, the core driver 202 determines whether these pieces of information match each other. If these pieces of information match each other, the process advances to S1611. The core driver 202 associates the connected USB device information with driver information contained in the matching table information (in this case, information of the image analysis board driver 211). This association allows the image analysis board driver 211 to handle the connected USB device. The process then ends. If the core driver 202 determines in S1610 that the connected USB device information does not match the registered information of the image analysis board 81, the process advances to S1612 to compare the connected USB device information with the next table information. In S1612, the core driver 202 acquires the class value (e.g., Cls=0x08) of a Mass Storage device (multimedia card reader 94/USB memory 95) on the third line of the table information. In S1613, the core driver 202 compares the information with information of the class of the USB device as represented by the protocol information of FIG. 7. In S1614, the core driver 202 determines whether these pieces of information match each other. If these pieces of information match each other, the process advances to S1615. The core driver 202 associates the connected USB device information with driver information contained in the matching table information (in this case, information of the Mass Storage driver 204). This association allows the Mass Storage driver 204 to handle the connected USB device. Thereafter, the process ends.

If the core driver 202 determines in S1614 that the connected USB device information does not match the registered information of the Mass Storage device (multimedia card reader 94/USB memory 95), the process advances to S1616 to compare the connected USB device information with the next table information. In S1616, the core driver 202 acquires the class value (e.g., Cls=0x03) of an HID device (keyboard 93) on the fourth line of the table information. In S1617, the core driver 202 compares the information with information of the class of the USB device as represented by the protocol information of FIG. 7. In S1618, the core driver 202 determines whether these pieces of information match each other. If these pieces of information match each other, the process advances to S1619. The core driver 202 associates the connected USB device information with driver information contained in the matching table information (in this case, information of the HID driver 203). This association allows the HID driver 203 to handle the connected USB device. After that, the process ends. If the core driver 202 determines in S1618 that the connected USB device information does not match the registered information of the HID device (keyboard 93), the process ends. In this case, a driver capable of handling the connected USB device is not registered in the scanned table. Thus, the device cannot be associated with a driver, and the connected USB device cannot be used.

By this processing, the system can inactivate USB host connections at once. In addition, connection of an unintended device can be excluded regardless of compatibility on the USB device side.

Second Embodiment

The second embodiment will be explained, in which while allowing connection of a device usable even after disabling the USB host connection, activation/inactivation can be set for each device when the USB host connection is activated. A description of the most part of the second embodiment overlaps that of the first embodiment, and only a difference will be explained. Processes for displays on an operation unit in FIGS. 16 and 17 are the same as those in the first embodiment.

<Operation Unit>

Figure 16:
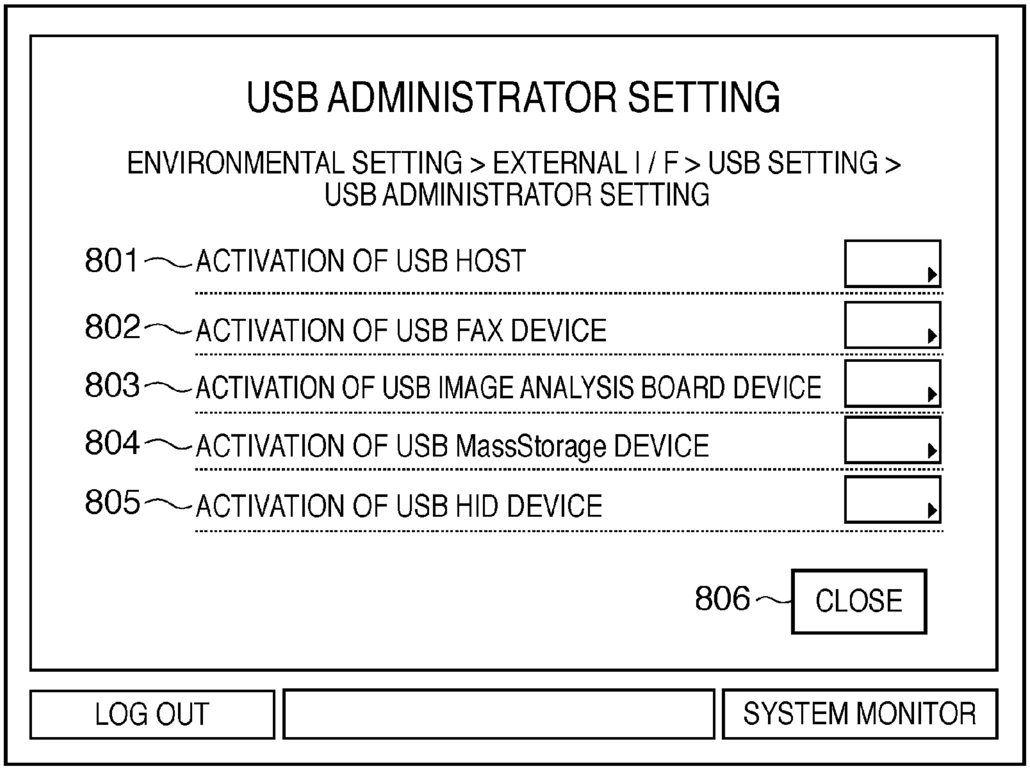
FIG. 16 is a view of a display exemplifying an operation unit in a second embodiment of the invention.

FIG. 16 shows a window and keys displayed upon pressing a setting key 403 in FIG. 8 described in the first embodiment. This window is particularly a setup window for all USB devices operable by an administrator. When the administrator presses the setting key, various environmental settings become possible. FIG. 16 exemplifies an USB administrator setup window. The environmental setting layer resides in a hierarchy "environmental setting>external I/F>USB setting>USB administrator setting". A window display key 801 is used to set activation of an USB host. A window display key 802 can be used to set activation of an USB-FAX board 82. A window display key 803 can be used to set activation of an image analysis board 81. A window display key 804 can be used to set activation of an USB Mass Storage device (e.g., a multimedia card reader 94/USB memory 95). A window display key 805 can be used to set activation of an USB HID device (e.g., a keyboard 93). When the administrator presses one of these keys, a window as shown in FIG. 10 described in the first embodiment appears in order to allow the administrator to set activation/inactivation. When the administrator presses a close key 806, the window disappears and returns to a window display in FIG. 8. The window in FIG. 16 is merely an example of the display, and the present invention is not limited to this format.

Figure 17:
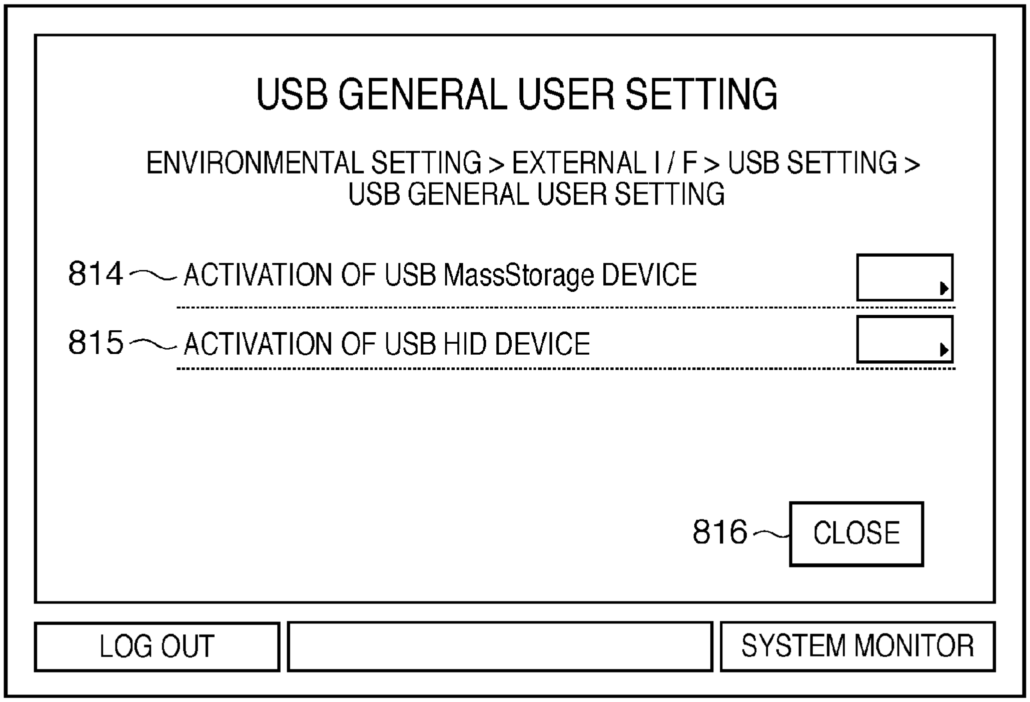
FIG. 17 is a view of a display exemplifying the operation unit in the second embodiment.

FIG. 17 is a view for explaining a window and keys displayed upon pressing the setting key 403 in FIG. 8 described in the first embodiment. This window is a setup window for specific USB devices operable by a general user. A general user cannot operate all devices, unlike an administrator, but can set only some functions. When the general user presses the setting key, various environmental settings become possible, but a description thereof will be omitted in the embodiment. FIG. 17 exemplifies an USB general user setup window. The environmental setting layer resides in a hierarchy "environmental setting>external I/F>USB setting>USB general user setting". A window display key 814 can be used to set activation of an USB Mass Storage device (e.g., the multimedia card reader 94/USB memory 95). A window display key 815 can be used to set activation of an USB HID device (e.g., the keyboard 93). When the general user presses either of the keys, a window as shown in FIG. 10 described in the first embodiment appears to allow him to set activation/inactivation. When the general user presses a close key 816, the window disappears and returns to the window display in FIG. 8. The window in FIG. 17 is also merely an example of the display, and the present invention is not limited to this format.

<Processing Sequence when System Starts>

FIGS. 18A and 18B are flowcharts of processing when the system for registering device drivers starts. In S701, the system starts. In S702, a driver control task refers to an USB connection activation flag. The activation flag indicates ON/OFF setting of activation described with reference to FIGS. 10 and 11 in the first embodiment. If it is determined in S703 that the activation flag is OFF, the driver control task registers only pre-registered device drivers in a core driver 202 in S704. For example, in the second embodiment, the driver control task registers only a fax driver 212 and image analysis board driver 211. If it is determined in S703 that the activation flag is ON, the process advances to S705 to shift to processing of determining the flag of each device. If it is determined in S705 that the activation flag of a fax device is OFF, the process advances to S706 to hold information in the driver control task so as not to register the FAX driver 212. Thereafter, the process advances to S708. If it is determined in S705 that the activation flag of a fax device is ON, the process advances to S707 to hold information in the driver control task so as to register the FAX driver 212. The process then advances to S708.

If it is determined in S708 that the activation flag of an image analysis board device is OFF, the process advances to S709 to hold information in the driver control task so as not to register the image analysis board driver. After that, the process advances to S711. If it is determined in S708 that the activation flag of an image analysis board device is ON, the process advances to S710 to hold information in the driver control task so as to register the image analysis board driver 211. The process then advances to S711. If it is determined in S711 that the activation flag of a Mass Storage device is OFF, the process advances to S712 to hold information in the driver control task so as not to register a Mass Storage driver 204. After that, the process advances to S714. If it is determined in S711 that the activation flag of a Mass Storage device is ON, the process advances to S713 to hold information in the driver control task so as to register the Mass Storage driver 204. The process then advances to S714. If it is determined in S714 that the activation flag of an HID device is OFF, the process advances to S715 to hold information in the driver control task so as not to register an HID driver 203. If it is determined in S714 that the activation flag of an HID device is ON, the process advances to S716 to hold information in the driver control task so as to register the HID driver. In S717, the driver control task registers pieces of information of device drivers in the core driver 202 based on the pieces of information which have been held for registration in the core driver 202. The process then ends.

By this processing, the system can inactivate more than one USB host connections at once. Further, activation/inactivation can be set for each USB device. Connection of an unintended device can be excluded regardless of compatibility on the USB device side.

Third Embodiment

The third embodiment will now be explained, in which activation/inactivation can be set for each physical USB host I/F so that a device for use can be connected even after disabling the USB host connection. A description of most of the third embodiment overlaps that of the first embodiment, and only the differences will be explained. Processes for a display on the operation unit in FIG. 19 are the same as those in the first embodiment.

Figure 19:
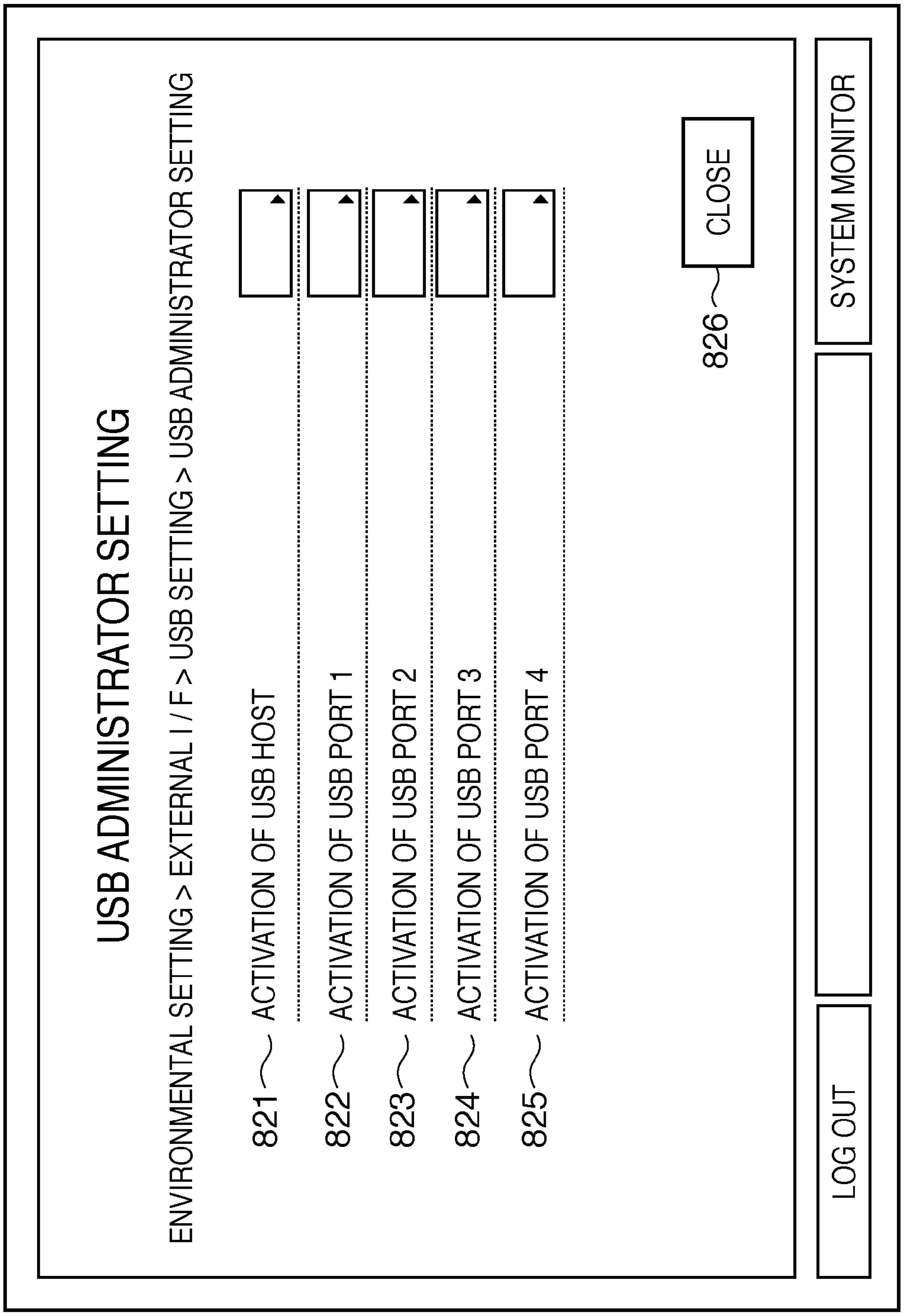
FIG. 19 is a view of a display exemplifying an operation unit in a third embodiment of the invention.

FIG. 19 exemplifies a window and keys displayed upon pressing a setting key 403 in FIG. 8 described in the first embodiment. This window is a setup window for all USB host I/Fs operable by an administrator. When the administrator presses the setting key, various environmental settings become possible, but a description thereof will be omitted in this embodiment. FIG. 19 shows an USB administrator setup window. The environmental setting layer resides in a hierarchy "environmental setting>external I/F>USB setting>USB administrator setting". A window display key 821 indicates an item for setting activation of an USB host. Window display keys 822, 823, 824, and 825 can be used to set activation of physical USB ports 1, 2, 3, and 4 of an information processing apparatus. The port name may be a user-friendly expression such as "port on the side of the main body". When the administrator presses one of these keys, the window shifts to a setup window corresponding to each port. When the administrator presses a close key 826, the window disappears and returns to a window display in FIG. 8. The setup window in FIG. 19 is merely an example of the display, and the format is arbitrary as long as the above-described function can be implemented. The third embodiment may be combined with the first or second embodiment to change the above-mentioned hierarchy and window display.

<Processing Sequence when Device is Connected>

Figure 20:
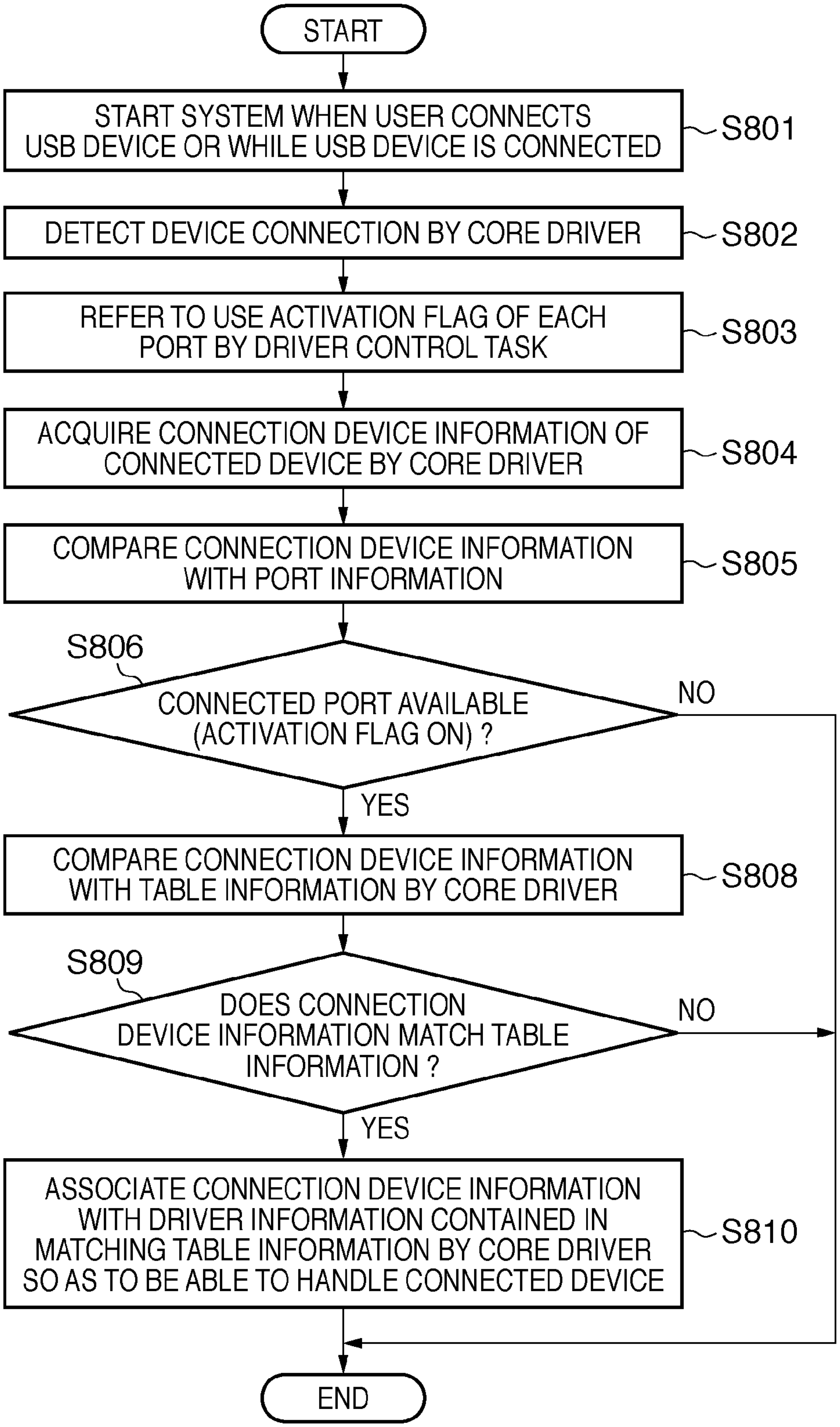
FIG. 20 is a flowchart for explaining an example of a processing sequence in the third embodiment.

FIG. 20 is a flowchart of processing when an USB device (e.g., a keyboard, USB memory, or fax) is connected. In S801, the system starts when the user connects an USB device or while an USB device is connected. In S802, a core driver 202 detects the USB device connection. In S803, a driver control task refers to an activation flag used for each port. In S804, the core driver 202 acquires information of a port connected to the USB device that is contained in protocol information shown in FIG. 7. In S805, the core driver 202 compares the activation flag acquired in S803 with the port information, and determines in S806 whether the connected port is available. If the connected port is not available (the activation flag is OFF), the process ends. If the connected port is available (the activation flag is ON), the process advances to S808. In S808, the core driver 202 scans the internal table and compares the acquired device information with information in the table. In S809, the core driver 202 determines whether the table information matches the device information. If these pieces of information match each other, the process advances to S810. The core driver 202 associates the device information of the connected USB device with driver information in the table so that the device can be used. Then, the process ends. If the core driver 202 determines in S809 that the device information of the connected USB device does not match any driver information, or determines in S806 that the connected port is not available, the process ends.

By this processing, activation/inactivation can be controlled for each USB physical I/F of the information processing apparatus. A more convenient USB host connection intended by a user can be achieved.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-03S818, filed Feb. 18, 2009, which is hereby incorporated by reference herein in its entirety.

What is claimed is:

1. An information processing apparatus capable of Universal Serial Bus (USB)-connecting a device that is compatible with a USB connection, the information processing apparatus comprising:

a display unit configured to display a window with which a user can set a choice among (a) activation of a USB connection of an externally USB-connected device, and (b) inactivation of the USB connection of the externally USB-connected device, wherein, in a case where there are a plurality of externally USB-connected devices, the inactivation inactivates each of the plurality of externally USB-connected devices at once; and a registration unit configured (a) in a case when the activation is set via the window, to register, in a USB core driver in the information processing apparatus, both (i) a device driver corresponding to the externally USB-connected device and (ii) a device driver corresponding to an internally USB-connected device, such that both device drivers are registered at the same time, and (b) in a case when the inactivation is set via the window, (i) not to register, in the USB core driver, the device driver corresponding to the externally USB-connected device, and (ii) to register, in the USB core driver, the device driver corresponding to the internally USB-connected device, wherein the USB core driver specifies a device driver corresponding to a device from device drivers registered by the registration unit and activates the specified device driver, and wherein a processor is included in the information processing apparatus.

2. The information processing apparatus according to claim 1, wherein the internally USB-connected device is a device that is USB-connected within the information processing apparatus, and wherein the externally USB-connected device is a device that is USB-connected physically outside the information processing apparatus.

3. The information processing apparatus according to claim 1, further comprising:

a holding unit configured to hold an activation driver list and an inactivation driver list, wherein the activation driver list defines both the device driver corresponding to the externally USB-connected device and the device driver corresponding to the internally USB-connected device, wherein the inactivation driver list does not define the device driver corresponding to the externally USB-connected device but defines the device driver corresponding to the internally USB-connected device, and wherein, in a case when the activation is set via the window, the registration unit registers a device driver based on the activation driver list and, in a case when the inactivation is set via the window, the registration unit registers a device driver based on the inactivation driver list.

4. The information processing apparatus according to claim 1, wherein in the case when the inactivation is set via the window, the registration unit registers, in the USB core driver, the device driver corresponding to the internally USB-connected device if the device driver corresponding to the internally USB-connected device is pre-registered.

5. The information processing apparatus according to claim 1, wherein there are a plurality of internally USB-connected devices including a facsimile device and a mass storage device, and wherein, in the case when the inactivation is set via the window, a device driver corresponding to the facsimile device is registered in the USB core driver, and a device driver corresponding to the mass storage device is not registered in the USB core driver.

6. A control method for controlling an information processing apparatus capable of Universal Serial Bus (USB)-connecting a device compatible with a USB connection, the method comprising the steps of:

displaying a window with which a user can set a choice among (a) activation of a USB connection of an externally USB-connected device, and (b) inactivation of the USB connection of the externally USB-connected device, wherein, in a case when there are a plurality of externally USB-connected devices, the inactivation inactivates each of the plurality of externally USB-connected devices at once;

registering, in the USB core driver in the information processing apparatus, in a case when the activation is set via the window, both (i) a device driver corresponding to the externally USB-connected device and (ii) a device driver corresponding to an internally USB-connected device, such that both device drivers are registered at the same time; and in a case when the inactivation is set via the window, registering, in the USB core driver, the device driver corresponding to the internally USB-connected device, without registering, in the USB core driver, the device driver corresponding to the externally USB-connected device, wherein the USB core driver specifies a device driver corresponding to a device from the registered device drivers and activates the specified device driver.

7. The control method according to claim 6, wherein the internally USB-connected device is a device that is USB-connected within the information processing apparatus, and wherein the externally USB-connected device is a device that is USB-connected physically outside the information processing apparatus.

8. The control method according to claim 6, further comprising the steps of:

holding an activation driver list and an inactivation driver list; and registering a device driver, wherein the activation driver list defines both the device driver corresponding to the externally USB-connected device and the device driver corresponding to the internally USB-connected device, wherein the inactivation driver list does not define the device driver corresponding to the externally USB-connected device but defines the device driver corresponding to the internally USB-connected device, and wherein in a case when the activation is set via the window, the device driver is registered based on the activation driver list, and in a case when the inactivation is set via the window, the device driver is registered based on the inactivation driver list.

9. A non-transitory computer-readable storage medium storing a computer program for causing a computer capable of Universal Serial Bus (USB)-connecting a device compatible with a USB connection to execute a method comprising the steps of:

displaying a window with which a user can set a choice among (a) activation of a USB connection of an externally USB-connected device, and (b) inactivation of the USB connection of the externally USB-connected device, wherein, in a case when there are a plurality of externally USB-connected devices, the inactivation inactivates each of the plurality of externally USB-connected devices at once;

registering, in a USB core driver in the computer, in a case when the activation is set via the window, a device driver corresponding to the externally USB-connected device and a device driver corresponding to an internally USB-connected device, such that both device drivers are registered at the same time; and in a case when the inactivation is set via the window, registering, in the USB core driver, the device driver corresponding to the internally USB-connected device, without registering, in the USB core driver, the device driver corresponding to the externally USB-connected device, wherein the USB core driver specifies a device driver corresponding to a device from the registered device drivers and activates the specified device driver.

10. The non-transitory computer-readable storage medium according to claim 9, wherein the internally USB-connected device is a device that is USB-connected within the information processing apparatus, and wherein the externally USB-connected device is a device that is USB-connected physically outside the information processing apparatus.

11. The non-transitory computer-readable storage medium according to claim 9, wherein the computer program further causes the computer to execute the steps of:

holding an activation driver list and an inactivation driver list; and registering a device driver, wherein the activation driver list defines both the device driver corresponding to the externally USB-connected device and the device driver corresponding to the internally USB-connected device, wherein the inactivation driver list does not define the device driver corresponding to the externally USB-connected device but defines the device driver corresponding to the internally USB-connected device, and wherein in a case when the activation is set via the window, the device driver is registered based on the activation driver list, and in a case when the inactivation is set via the window, the device driver is registered based on the inactivation driver list.

* * * * *